US012192043B2

(12) United States Patent
Hemadeh et al.

(10) Patent No.: US 12,192,043 B2
(45) Date of Patent: Jan. 7, 2025

(54) RECONFIGURABLE INTELLIGENT SURFACE (RIS) BASED BEAMFORMING AND/OR MODULATION

(71) Applicant: InterDigital Patent Holdings, Inc., Wilmington, DE (US)

(72) Inventors: Ibrahim Hemadeh, Hemel Hempstead (GB); Allan Tsai, Boonton, NJ (US); Arman Shojaeifard, London (GB); Deepa Gurmukhdas Jagyasi, London (GB); Qingchao Li, Southampton (GB); Mohammed El-Hajjar, Southampton (GB); Lajos Hanzo, Southampton (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 130 days.

(21) Appl. No.: 17/977,779

(22) Filed: Oct. 31, 2022

(65) Prior Publication Data

US 2024/0171447 A1    May 23, 2024

(51) Int. Cl.
*H04L 27/36*    (2006.01)
(52) U.S. Cl.
CPC ................... *H04L 27/36* (2013.01)
(58) Field of Classification Search
CPC ...... H04B 10/112; H04B 10/516; H04L 27/36
See application file for complete search history.

(56) References Cited

U.S. PATENT DOCUMENTS

2023/0246657 A1*  8/2023  Paz ................ H04B 1/04
                                                    455/114.3
2024/0137121 A1*  4/2024  Sun ................ H04B 10/112

OTHER PUBLICATIONS

Tang et al. "MIMO Transmission Through Reconfigurable Intelligent Surface: System Design, Analysis, and Implementation". IEEE Journal on Selected Areas in Communications, vol. 38, No. 11, Nov. 2020. Accessed from https://ieeexplore.ieee.org/document/9133266 on May 3, 2024 (Year: 2020).*

(Continued)

*Primary Examiner* — David S Huang
(74) *Attorney, Agent, or Firm* — Flaster Greenberg P.C.

(57) ABSTRACT

Methods and apparatuses for controlling a reconfigurable intelligent surface (RIS) to generate one or more modulated symbols may be described herein. The processor may be configured to generate an amplitude of the modulated symbol(s) by activating one or more of the plurality of portions of the RIS. The processor may be configured to generate a phase of modulated symbol(s) by controlling one or more phase shifts applied by one or more activated portions of the RIS. The method may include transmitting the one or more modulated symbols using the RIS. The method may include a RIS-based joint beamforming and/or modulation scheme with low PAPR. The RIS may be divided into one or more portions for attaining various gains. The RIS may be divided into an In-phase and/or Quadrature branches. The method may include an Amplitude-phase shift keying (A-PSK) and/or Quadrature amplitude-phase shift keying (AQ-PSK) joint beamforming and/or modulation scheme(s).

20 Claims, 33 Drawing Sheets

(56) References Cited

OTHER PUBLICATIONS

Yuan et al. "Receive Quadrature Reflecting Modulation for RIS-Empowered Wireless Communications". IEEE Transactions Onvehiculartechnology, vol. 70, No. 5, May 2021. Accessed from https://ieeexplore.ieee.org/document/9405433 on May 4, 2024 (Year: 2021).*
W. Tang, et al, "Programmable metasurface-based RF chain-free 8PSK wireless transmitter," Electronics Letters, vol. 55, No. 7, pp. 417-420, 2019.
Q. Li, et al, "Reconfigurable Intelligent Surface Aided Amplitude- and Phase-Modulated Downlink Transmission," in IEEE Transactions on Vehicular Technology, vol. 72, No. 6, pp. 8146-8151, Jun. 2023, doi: 10.1109/TVT.2023.3239545.
Z. Q. He and X. Yuan, "Cascaded channel estimation for large intelligent metasurface assisted massive," IEEE Wireless Commun. Lett., vol. 9, pp. 210-214, 2019. 5pp.
Q. Wu and R. Zhang, "Intelligent Reflecting Surface Enhanced Wireless Network via Joint Active and Passive Beamforming," IEEE Transactions on Wireless Communications, vol. 18, pp. 5394-5409, 2019. 16pp.
L. Dai, B. Wang, M. Wang, X. Yang, J. Tan, S. Bi, S. Xu, F. Yang, Z. Chen, M. D. Renzo, C. B. Chae and H. L, "Reconfigurable Intelligent Surface-Based Wireless Communications: Antenna Design, Prototyping, and Experimental Results," IEEE Access, vol. 8, pp. 45913-45923, 2020.9 pp.
S. Sugiura, S. Chen and L. Hanzo, "Space-Time Shift Keying: A Unified MIMO Architecture," in IEEE Global Telecommunications Conference, 2010. 5 pp.
R. Y. Mesleh, H. Haas, S. Sinanovic, C. W. Ahn and S. Yun, "Spatial Modulation," IEEE Transactions on Vehicular Technology, vol. 57, pp. 2228-2241, Jul. 2008. 14pp.
I. A. Hemadeh, M. El-Hajjar, S. Won and L. Hanzo, "Multi-Set Space-Time Shift-Keying With Reduced Detection Complexity," IEEE Access, vol. 4, pp. 4234-4246, 2016. 13 pp.
Y. Ding, V. Fusco, A. Shitvov, Y. Xiao and H. Li, "Beam Index Modulation Wireless Communication With Analog Beamforming," IEEE Transactions on Vehicular Technology, vol. 67, pp. 6340-6354, 2018. 16pp.
B. C. R. M. Shanpu Shen, "Modeling and Architecture Design of Intelligent Reflecting Surfaces using Scattering Parameter Network Analysis," arXiv, 2020. 14pp.
V. Laur, J. P. Gouavogui and B. Balde, "C-Band Hybrid 3-D-Printed Microwave Isolator," IEEE Transactions on Microwave Theory and Techniques, vol. 69, pp. 1579-1585, 2021. 7 pp.
S. Shen, B. Clerckx and R. Murch, "Modeling and Architecture Design of Intelligent Reflecting Surfaces using Scattering Parameter Network Analysis," arXiv, 2020. 14pp.
S. Yang, D. Vincent, J. R. Bray and L. Roy, "Study of a Ferrite LTCC Multifunctional Circulator With Integrated Winding," IEEE Transactions on Components, Packaging and Manufacturing Technology, vol. 5, pp. 879-886, 2015. 8pp.
J. Wang, A. Yang, Y. Chen, Z. Chen, A. Geiler, S. M. Gillette, V. G. Harris and C. Vittoria, "Self Biased Y-Junction Circulator at ${\rm K}_ {\rm u} $ Band}," IEEE Microwave and Wireless Components Letters, vol. 21, pp. 292-294, 2011. 3pp.
W. D'Orazio, K. Wu and J. Helszajn, "A Substrate Integrated Waveguide Degree-2 Circulator," IEEE Microwave and Wireless Components Letters, vol. 14, pp. 207-209, 2004. 3pp.
S. Adhikari, A. Ghiotto, S. Hemour and K. Wu, IEEE MTT-S International Microwave Symposium Digest (MTT), pp. 1-3, Tunable Non-reciprocal Ferrite Loaded SIW Phase Shifter. 3pp.
A. Li, S. Singh and D. Sievenpiper, "Metasurfaces and their applications," Nanophotonics, vol. 7, pp. 989-1011, 2018. 23pp.
C. Liaskos, S. Nie, A. Tsioliaridou, A. Pitsillides, S. Ioannidis and I. Akyildiz, "A New Wireless Communication Paradigm Through Software-Controlled Metasurfaces," IEEE Communications Magazine, vol. 56, p. 162-169, 2018. 8pp.

* cited by examiner

600b

Frequency upconverters    Power amplifiers   Antenna elements

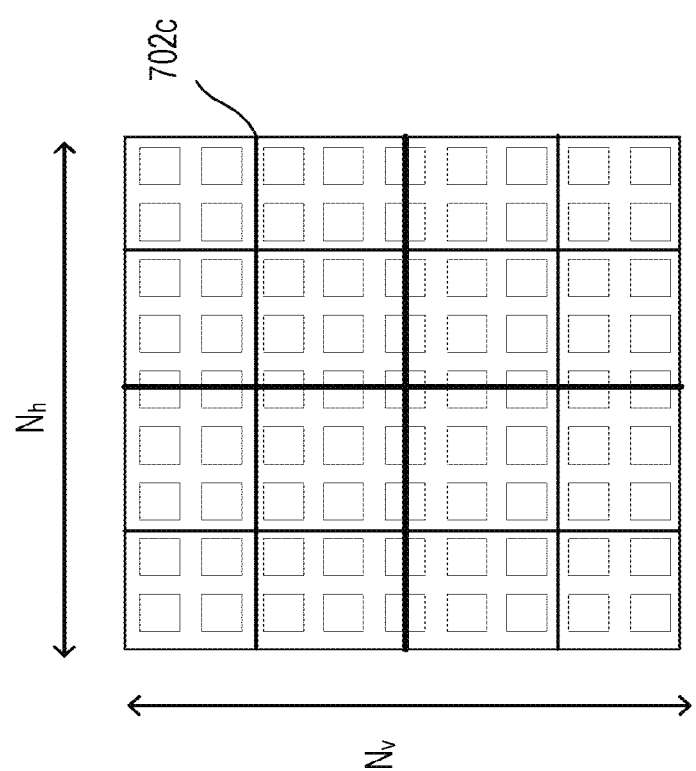

RECONFIGURABLE INTELLIGENT SURFACE (RIS) BASED BEAMFORMING AND/OR MODULATION

BACKGROUND

A Reconfigurable intelligent surface (RIS) is a programmable or controllable structure that can be used to control the propagation of electromagnetic waves by changing the electric and magnetic properties of the surface. By placing these surfaces in a radio environment, the properties of radio channel(s) can be controlled. This opens up new opportunities to improve the performance of wireless systems.

SUMMARY

In examples, a transmitter device may comprise a reconfigurable intelligent surface (RIS). The RIS may comprise a plurality of separately activable and/or controllable portions. In examples, a process may be further configured to control the RIS to generate one or more modulated symbols, wherein the processor is configured to generate an amplitude of the one or more modulated symbols by activating one or more of the plurality of portions of the RIS. In examples, the processor may be further configured to generate a phase of the one or more modulated symbols by controlling one or more phase shifts applied by the one or more activated portions of the RIS.

In examples, the processor may be further configured to apply a respective beamforming weight to each of the one or more activated portions of the RIS.

In examples, the processor may be further configured to control the RIS to generate a plurality of modulated symbols, wherein each of the plurality of modulated symbols is generated using a different section of the RIS.

In examples, the transmitter device may include that each of the different sections of the RIS is associated with a plurality of respective portions.

In examples, the transmitter device may include that each of the plurality of respective portions for a given section is controlled by the processor to generate a respective modulated symbol of the plurality of modulated symbols (e.g., by controlling which of the respective portions are activated and/or controlling which of the respective phase shifts applies to one or more of the respective activated portions.

In examples, the transmitter device may include that the plurality of portions of the RIS comprise a first subset of portions and a second subset of portions, wherein the first subset of portions is controlled by the processor to generate an in-phase part of the one or more modulated symbols, and/or the second subset of portions is controlled by the processor to generate a quadrature part of the one or more modulated symbol.

In examples, the transmitter device may include that the one or more modulated symbols correspond to a quadrature amplitude phase shift keying (QA-PSK) type of modulated symbol.

In examples, the transmitter device may include a processor that is further configured to control the RIS to transmit a reference signal without applying a phase shift to the reference signal.

In examples, the transmitter device may include a processor that is further configured to receive channel quality indication (CQI) feedback, wherein the CQI feedback indicating preferred portions of the RIS for transmission.

In examples, a method implemented by a transmitter device may comprise controlling a reconfigurable intelligent surface (RIS) to generate one or more modulated symbols. The RIS may comprise a plurality of separately activable and/or controllable portions. The RIS may comprise activating one or more of the plurality of portions of the RIS to generate an amplitude of the one or more modulated symbols. The RIS may comprise generating a phase of the one or more modulated symbols based on phase shifts applied by the one or more activated portions of the RIS. In examples, the method may further comprise transmitting the one or more modulated symbols using the RIS.

In examples, the method may further include that the one or more modulated symbols comprise a plurality of modulated symbols, and/or different sections of the RIS are used for generating each of the plurality of modulated symbols.

In examples, the method may further include that each of a plurality of respective portions of a given section is used to generate a respective modulated symbol of the plurality of modulated symbols by controlling which of the respective portions are activated and/or controlling which of the respective phase shifts applies to one or more of the respective activated portions.

In examples, the method may further include that the plurality of portions of the RIS comprise a first subset of portions and/or a second subset of portions. In examples, the first subset of portions may be used to generate an in-phase part of the one or more modulated symbols. In examples, the second subset of portions may be used to generate a quadrature part of the one or more modulated symbol.

In examples, the method may further include that the one or more modulated symbols correspond to a quadrature amplitude phase shift keying (QA-PSK) type of modulated symbol.

In examples, the method may further include that the one or more modulated symbols correspond to an amplitude phase shift keying (A-PSK) type of modulated symbol.

In examples, the method may further comprise transmitting a reference signal using the RIS. The reference signal may be transmitted without applying a phase shift to the reference signal.

In examples, the method may further comprise receiving channel quality indication (CQI) feedback. The CQI feedback may indicate preferred portions of the RIS transmission.

In examples, a transmitter device may comprise a reconfigurable intelligent surface (RIS). The RIS may comprise a plurality of sections. Each of the plurality of sections may comprise separately activable and/or controllable portions.

In examples, the transmitter device may further comprise a processor configured to transmit a first modulated symbol using a first section of the plurality of sections of the RIS. In examples, the processor may be configured to generate an amplitude of the first modulated symbol by activating one or more portions of a plurality of portions of the first section of the RIS. Additionally or alternatively, the processor may be configured to generate a phase of the first modulated symbol by controlling the RIS to apply one or more phase shifts to the one or more activated portions of the first section of the RIS.

In examples, the transmitter device may further comprise a processor configured to transmit a second modulated symbol using a second section of the plurality of sections of the RIS. The processor may be configured to generate an amplitude of the second modulated symbol by activating one or more portions of a plurality of portions of the second section of the RIS. Additionally or alternatively, the processor may be configured to generate a phase of the second modulated symbol by controlling the RIS to apply one or more phase shifts to the one or more activated portions of the second section of the RIS.

In examples, the transmitter device may include a processor that is further configured to control the RIS to apply a respective beamforming weight to each of the one or more activated portions of the first section of the RIS and/or the one or more activated portions of the second section of the RIS.

DETAILED DESCRIPTION

Figure 1A:
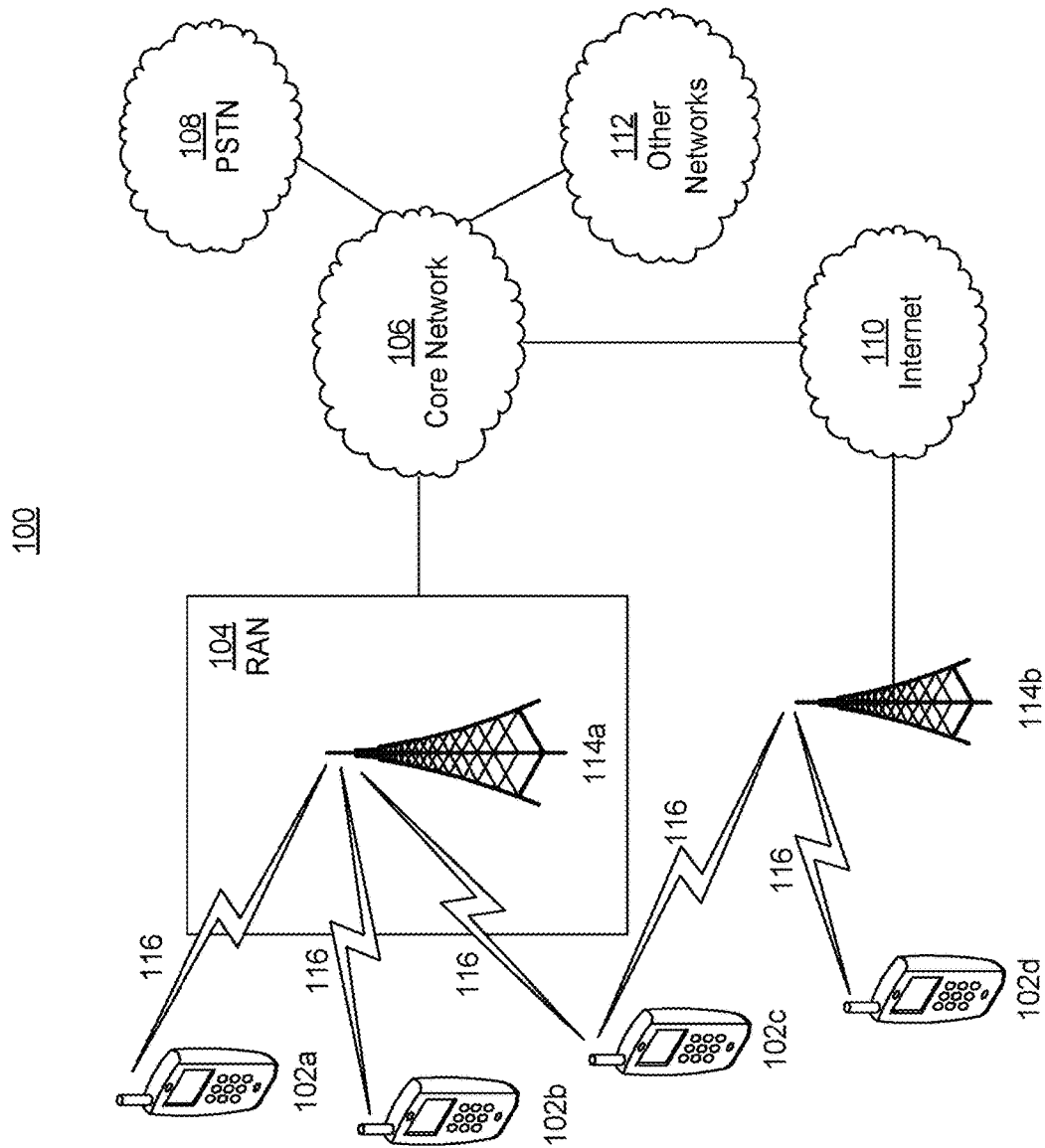
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
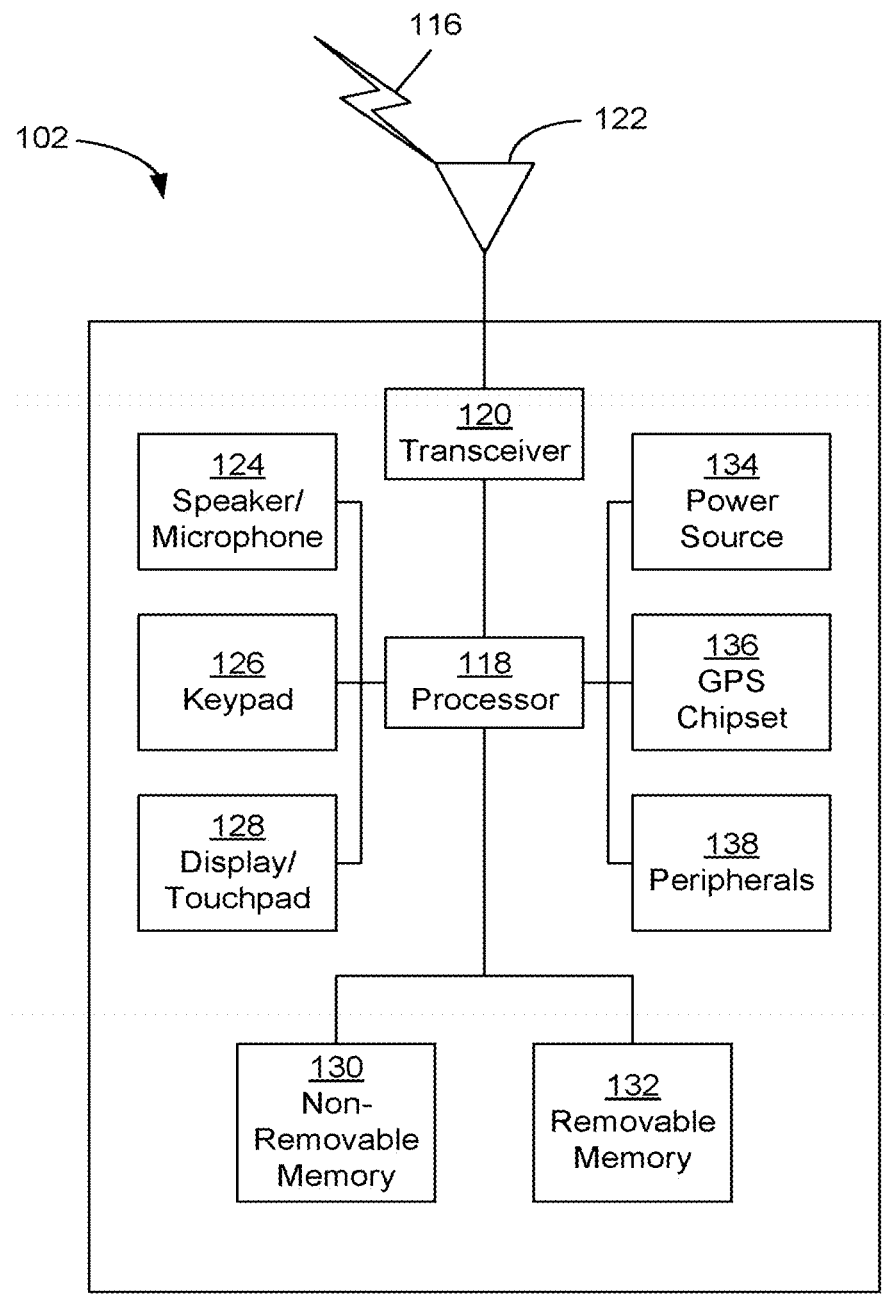
FIG. 1B is a system diagram illustrating an example wireless transmit/receive unit (WTRU) that may be used within the communications system illustrated in FIG. 1A according to an embodiment.
Figure 1C:
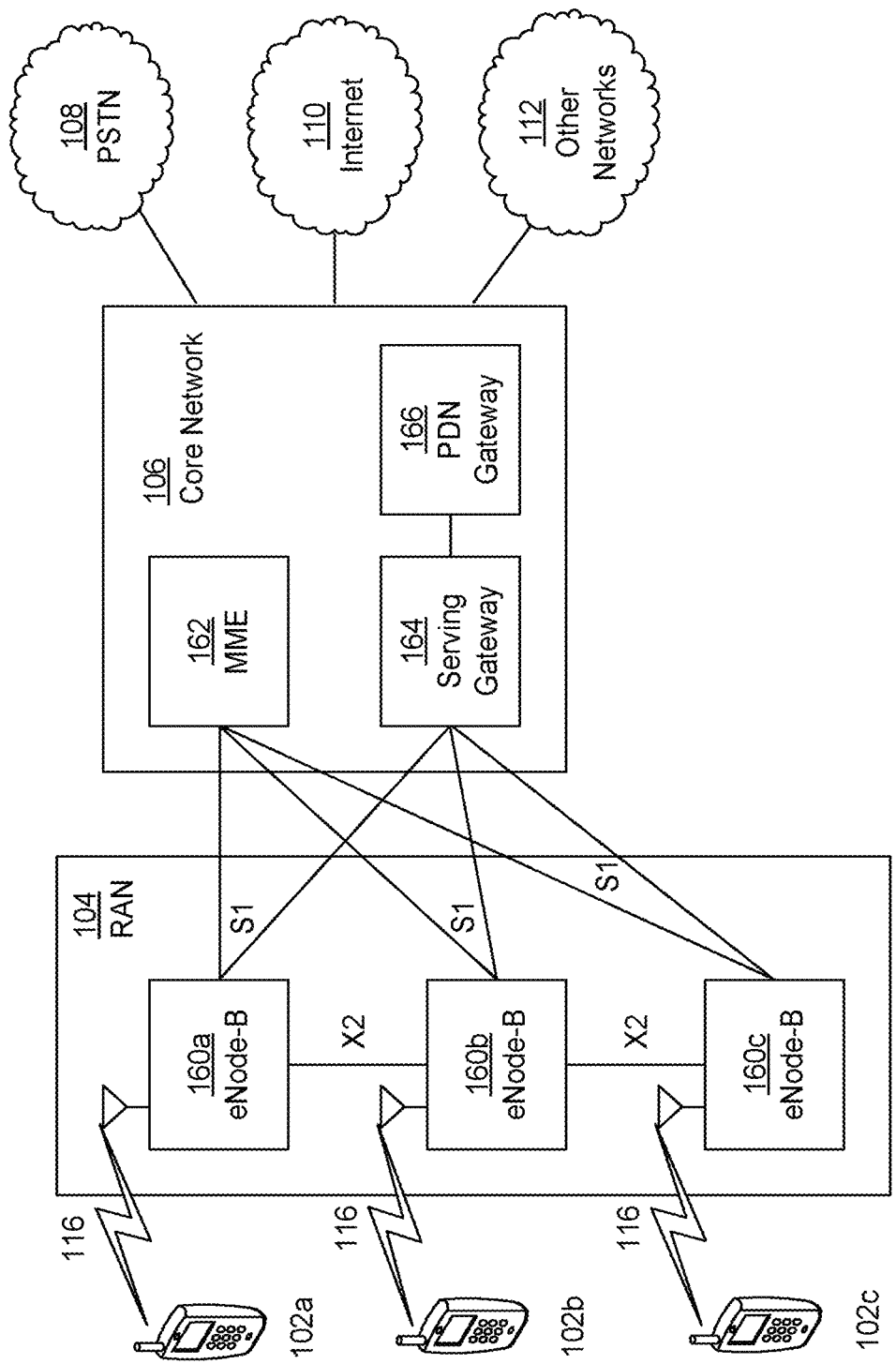
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 18 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Figure 18:
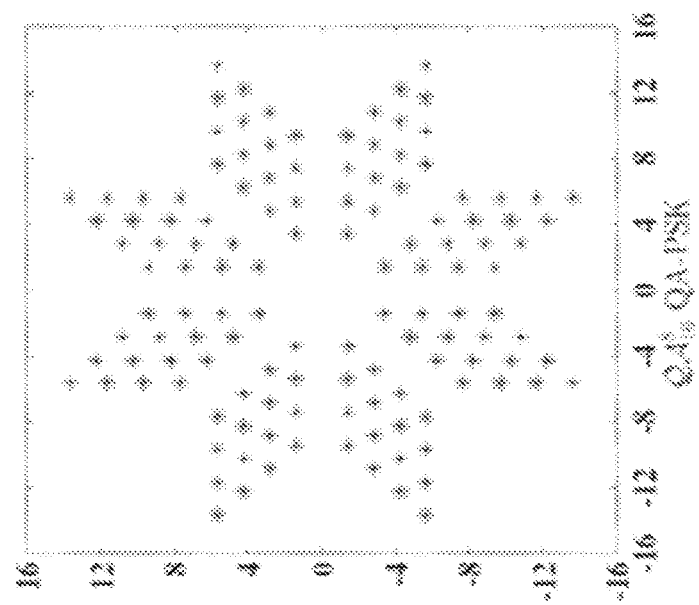
FIG. 18 illustrates an example of the statistical CSI-based received signal constellation of $A_{16}^8$ QA-PSK.

Although the transmit/receive element 122 is depicted in FIG. 18 as a single element, the WTRU 102 may include any number of transmit/receive elements 122. More specifically, the WTRU 102 may employ MI MO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
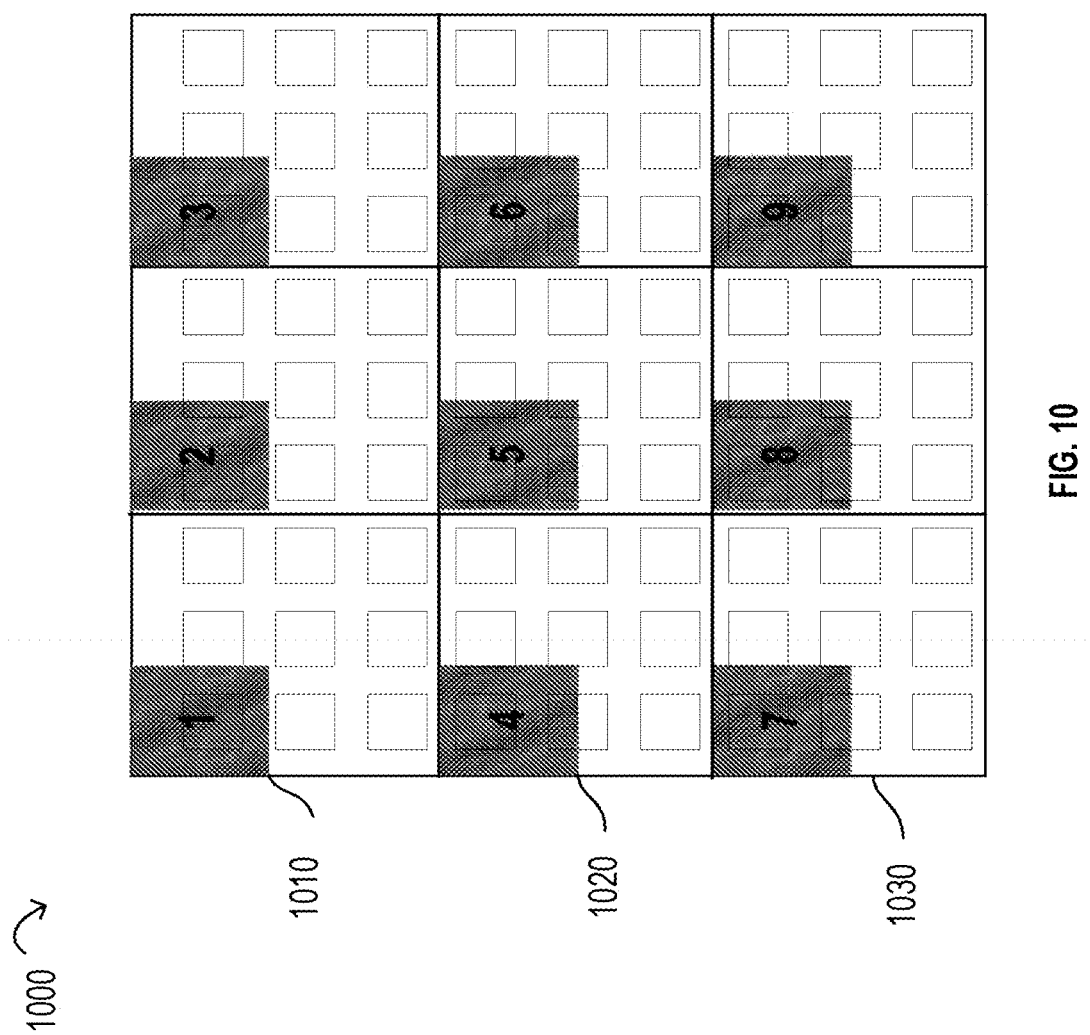
FIG. 10 illustrates an example of a RIS portion division.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
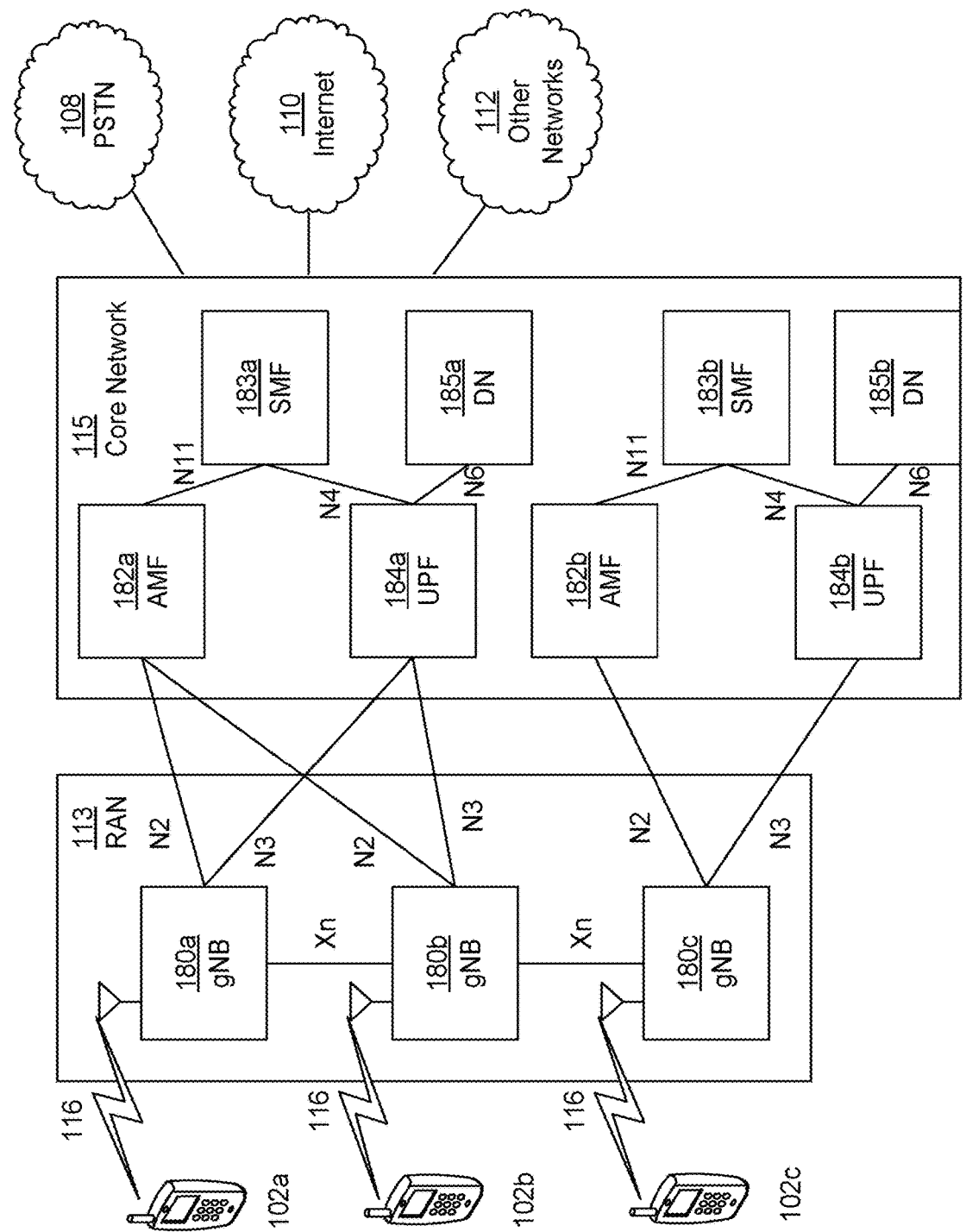
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MI MO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A Reconfigurable intelligent surface (RIS) may be used to generate one or more modulated symbols. The RIS may be used to beamform the one or more modulated symbols. For example, a joint beamforming and modulation scheme may be used by controlling which portions of a RIS are activated and the phase shifts that are applied by the activated portions of the RIS. Described below are various techniques for using a RIS to implement the disclosed modulation and/or beamforming methods.

RISs have recently emerged as a promising candidate for future wireless communication systems. Generally, a RIS is a device that can be configured to control of radio signal(s) between a transmitter and a receiver in a dynamic manner. For example, the RIS may include a plurality of different elements arranged in a manner whereby elements of the RIS can be configured to reflect, amplify, attenuate, and/or phase shift, impinging radio signals in a controllable manner. By tuning or controlling individual reflective elements in the RIS, the RIS may be used to reflect or re-transmit the radio signal in a desired way in order to achieve various design goals, such as increasing capacity, increasing coverage, improving positioning, enhancing security, and increasing sustainability (e.g., by lowering power usage through use of passive elements), as well as the support of further sensing, wireless power transfer, and ambient backscattering capabilities. As an example, a RIS could be position between a wireless transmitter and a wireless receiver in the uplink, downlink, and/or sidelink in order to achieve various system objectives.

For instance, a RIS may be capable of reconfiguring the wireless environment by, for example, utilizing a plurality of passive reflecting elements for adjusting the phase shift and/or even potentially adjusting the amplitude of the one or more signals that interact with the RIS (e.g., impinging signals). RISs may include passive, active and/or semi-active elements (e.g., meta-surfaces, reflection-arrays and/or antenna elements, for example, where passive elements may include no dedicated energy source such as a battery or power supply). The RIS surfaces may be mainly utilized for controlling the environment, for example, where wireless signals propagate. RIS(s) may be used to impact or affect on the received signal strength and/or the spectral efficiency.

The term RIS is used herein for purposes of brevity and explanation, but other terms may also be used to refer to similar hardware components. For example, a RIS may also be referred to using the following non-exclusive list of terms/systems: Intelligent Reflecting Surface (IRS), Large Reflecting Surface (LIS), Holographic Radio, Holographic Multiple-Input Multiple-Output (MIMO), Reconfigurable Holographic Surface (RHS), and/or the like. The terms RIS and RHS may be used interchangeably, as described herein. A RIS/RHS may be employed at a network node (e.g., a gNB, a BSS, relay, repeater, etc.) and/or a WTRU.

RISs may be configured to be utilized as a transmitter, for example, using a single RF chain. For example, a RIS may be configured to convey information by appropriately configuring the reflection coefficients of the passive RIS elements to achieve the desired reflection result (e.g., known as holographic beamforming). RISs may have promising applications in wireless communications, for example, as a benefit of the RISs' extremely low hardware complexity (e.g., compared to massive MIMO systems).

Figure 2:
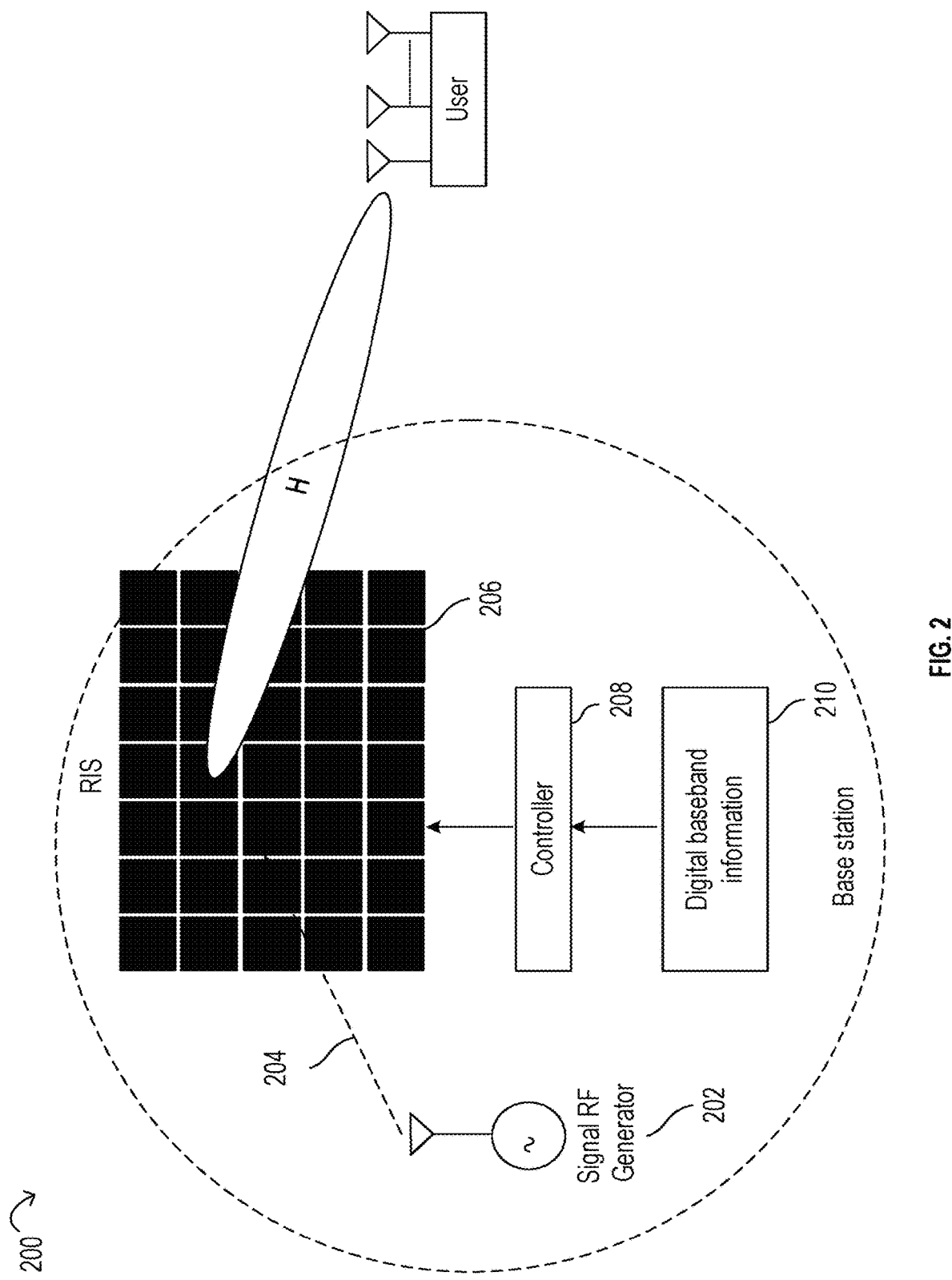
FIG. 2 illustrates an example of a single RF-chain RIS-based transmitter (e.g., holographic radio) with a single user.

A RIS 206 may be configured as a low-complexity transmitter 200, for example, as shown in FIG. 2. FIG. 2 depicts an example of a single RF chain 202 that may generate the unmodulated carrier of signals 204 impinging on the N-element RIS 206 (e.g., with passive elements). The RIS controller 208 may map the baseband information 210 into the phase shifts of the RIS elements 206, for example, based on the channel state information (CSI). The information 210 may be conveyed using a specific RIS phase pattern configuration. The carrier wave (e.g., carrier wave impinging on the RIS) may be reflected to the K-antenna single-user receiver. FIG. 2 illustrates an example of a single user case, however multiple users may be supported (e.g., by time division multiple access (TDMA)). The transmit RF chain 202 may be located close to the RIS 206. The RIS 206 may be viewed as part of the transmitter.

A RIS may be configured to perform M-PSK modulation.

In the RIS-based M-PSK modulation, for example, the channel fading experienced by one or more (e.g., all) RIS elements may be coherently combined for detecting the transmitted information symbol. For example, M may represent the number of possible states of a modulated symbol m (e.g., where m=0, 1, . . . , M-1). M may denote the size of the modulation scheme. For example, 16-PSK may mean that there are 16 constellation points in the modulation scheme. The phase shift of the RIS elements may be designed as $$\Theta = \angle_B\left(e^{j\frac{2\pi}{M}m \sin \phi}\right),$$

with $\angle_B(.)$ representing the phase calculation using B-bit quantization. In examples, $\Theta$ may denote the set(s) of M Phase-shifts. In examples, M=16 may be the total number of constellation points (e.g., or phase shifts). In examples, m may denote the m-th constellation point and/or $\sin\phi$ may be the conjugate of the angle of arrival at the receiver.

The signal set of M-PSK modulation may be given by $$\mathcal{M}_{M-PSK} = \left\{ \angle_B\left(e^{j\frac{2\pi}{M}m \sin \phi}\right) \Big| m = 0, 1, \ldots, M-1 \right\}.$$

Figure 3:
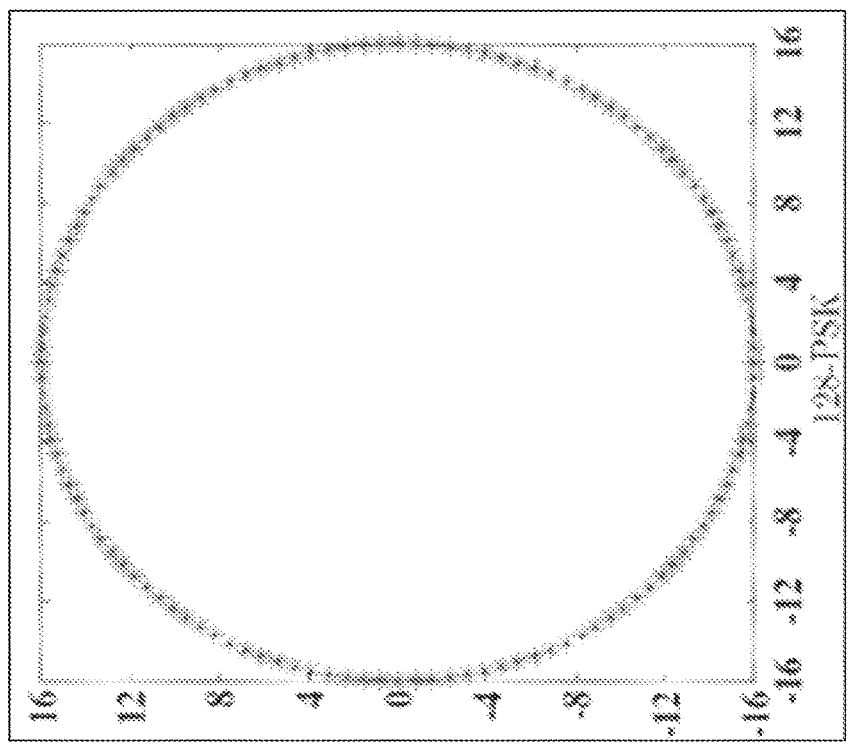
FIG. 3 illustrates an example of a statistical CSI-based received signal constellation in the RIS-based 129-PSK.

In examples, $\mathcal{M}_{M-PSK}$ may denote the set of M-PSK symbols given by $\Theta$. When $M \leq 2^B$, for example, the received signals may have a unique envelope, and/or $\mathcal{M}_{M-PSK}$ may be simplified as $$\left\{ e^{j\frac{2\pi}{M}m \sin \phi} X \Big| m = 0, 1, \ldots, M-1 \right\},$$

where X is the constant envelope of the received signals (e.g., no information is modulated over the amplitude since it is a PSK modulation). However, when $M > 2^B$, for example, the envelope of the received signals in $\mathcal{M}_{M-PSK}$ may not necessarily be unique, for example, due to the B-bit phase-quantization. FIG. 3 shows an example of the statistical CSI-based received signal constellation of 128-PSK modulation 300.

Future releases of 5G may consider ultramassive (UM) Multiple Input Multiple Output (MIMO) (UM-MIMO) deployments with up to thousands of antennas for achieving, for example, an excess of 1 Tb/s transmission rate. A transmission rate in excess of 1 Tb/s may utilize a massive Radio frequency (RF) chains implementations (e.g., each with digital-to-analog converters (DACs), mixers, and/or amplifiers), which induces high hardware complexity and/or power consumption.

A RIS surface may be utilized for attaining an energy-efficient and/or cost-effective communication that can achieved similar results as UM-MIMO deployments (e.g., with reduced hardware elements).

There may be three major types of beamforming architectures in (massive) MIMO. For example, beamforming can be achieved using analog beamforming, (full) digital beamforming, and/or hybrid beamforming architectures. However, MIMO architectures may have some drawbacks and/or limitations. For example, analog beamforming may be cost-effective, but analog beamforming may manage and/or generate one (e.g., only one) signal beam. Additionally or alternatively, the hybrid beamforming may suffer from the beam squint effect, which is an unwanted scheme for wideband and/or broadband application. In examples, wideband and/or broadband application may be a desired use case for NR or future 6G.

Although fully digital beamforming may have control (e.g., full control) of each antenna element(s), digital beamforming may include one transceiver unit (TXRU) for each antenna element. As a result, digital beamforming may be costly and/or power hungry, which may hamper a power saving consideration such as a WTRU utilizing a battery or that is otherwise power limited.

Hybrid beamforming may compromise the analog beamforming and/or digital beamforming schemes. Hybrid beamforming scheme may also inherit some of drawbacks from the analog beamforming and/or digital beamforming scheme(s).

A relatively high order modulation (e.g., 256 QAM or higher) may be a desired transmission scheme for NR and/or future 6G. A relatively high order modulation may enhance the data throughput and/or the spectrum utilization (e.g., bits/Hz). However, support of relatively high order modulation may include higher peak-to-average power ratio (PAPR) in the classical transmitter design. Requiring a higher PAPR may be because, for example, the higher order modulation is generated at the baseband level and/or the baseband signal goes through DAC and/or power amplifier (PA). Backoff may be considered for PA to avoid saturation, for example, if the baseband signal has higher PAPR. For high frequency range (e.g., mmWave, sub THz and/or THz) application, PA power efficiency may be lower and/or backoff of PA may be further lowering the PA efficiency.

Additionally or alternatively, using higher frequency bands, such as mmWaves and/or sub-THz/THz frequency bands (e.g., above 100 GHz), may pose challenges to the transceiver design, for example, as a result of the increased number of antenna elements. For example, the size of the RF amplifier may be too large to physically place behind antenna elements, which are closely packed to avoid granting lobes. Further challenges may arise in the implementation of power amplifiers and/or analog-to-digital convertors, which become power hungry high frequencies (e.g., 100 GHz and beyond).

The systems and methods disclosed herein may include a new holographic transmitter architecture. The new holographic transmitter architecture may be relatively low complex and may avoid some (e.g., or all) of the drawbacks of classical analog, digital, and/or hybrid beamforming architecture(s). The new low-complexity holographic transmitter architecture may be utilized to generate modulation signals (e.g., relatively higher order modulation symbols) with relatively low PAPR. A RIS may be configured to generate modulated symbols by controlling amplitude and/or the phase component(s) of various portions or sections of the RIS.

A RIS may be configured to perform modulation.

A RIS may be configured to perform in a system that includes a wireless transmission system that includes multiple components: a transmitter (Tx) with an antenna, a RIS/RHS, and a receiver with an antenna. For example, in some embodiments the transmitter may include a single RF chain with single antenna. In some embodiments, the transmitter may include multiple RF chains and/or multiple antennas. Similarly, in some embodiments the receiver may include a single RF chain with single antenna. In some embodiments, the receiver may include multiple RF chains and/or multiple antennas. The RIS/RHS may be configured to perform modulation (e.g., on the reflected/refracted signals) from the transmitter. The RIS/RHS may be configured to implement beamforming on the signal transmitted from the transmitter. For example, the RIS/RHS may be configured to perform a joint modulation and beam forming operation on the signal transmitter from the transmitter (e.g., to assist the transmission from the Tx to the Rx).

Figure 4:
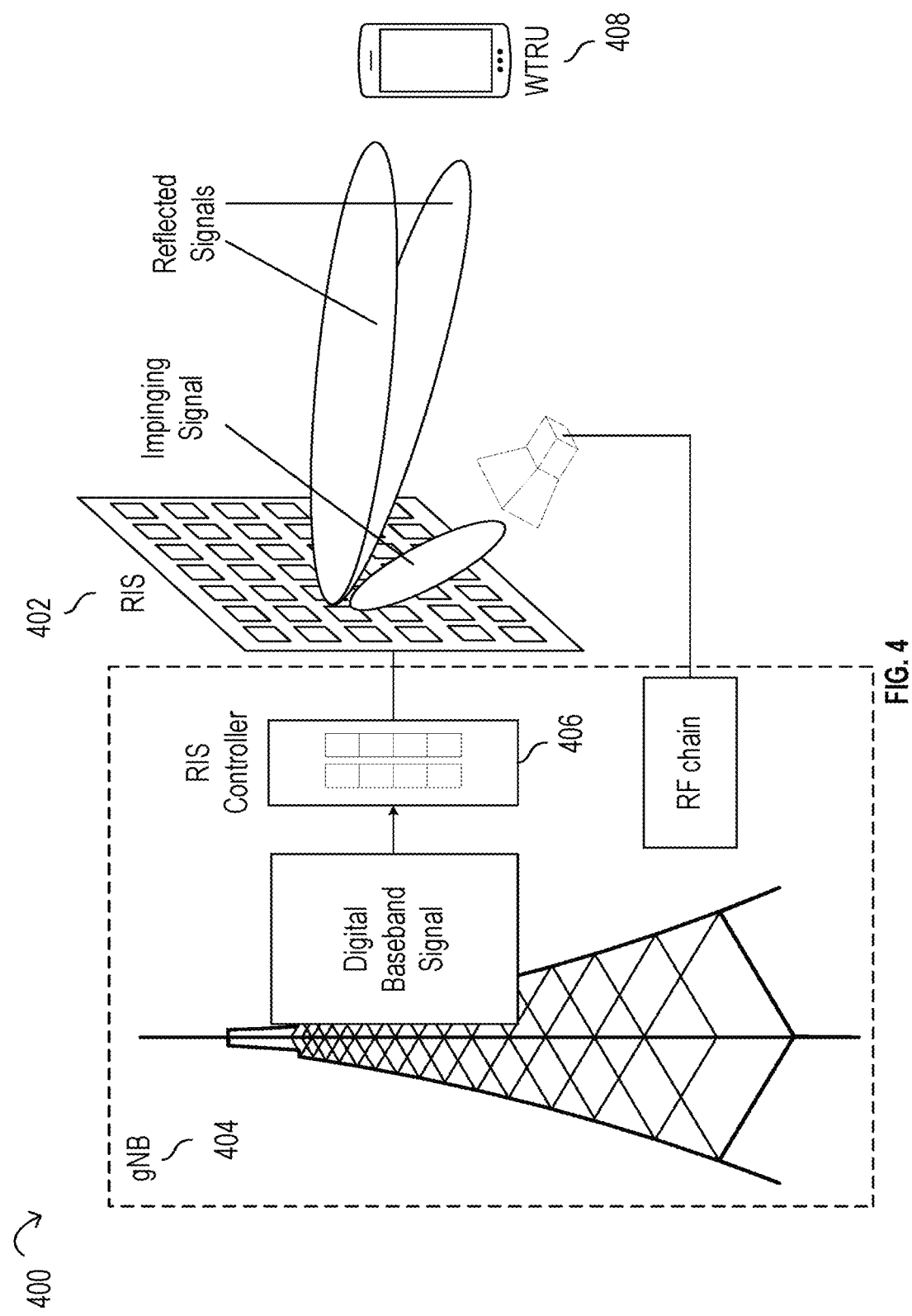
FIG. 4 illustrates an example of a RIS/RHS-based gNB transmission.

A RIS may perform modulation in a variety of system architectures. The RIS/RHS-based transmission scheme may be deployed both at the gNB and/or the WTRU. For example, the RIS/RHS may be configured to be used for uplink operation at the WTRU, downlink operation at the gNB, and/or sidelink operation (e.g., at the WTRU). As shown in FIG. 4, the RIS/RHS 400 may be located at or near the gNB/BS 404, for example, if the RIS/RHS-based transmission is deployed at the base station side. As FIG. 4 depicts, one or more antenna(s) (e.g., a single antenna, and/or multiple antennas) may transmit a signal (e.g., a single-tone signal) towards the RIS array 402. The RIS controller 406 may be configured to tune the configurations of the elements of the RIS in such a way that the modulated signal is reflected at the surface RIS for transmission to the WTRU 408.

Figure 5:
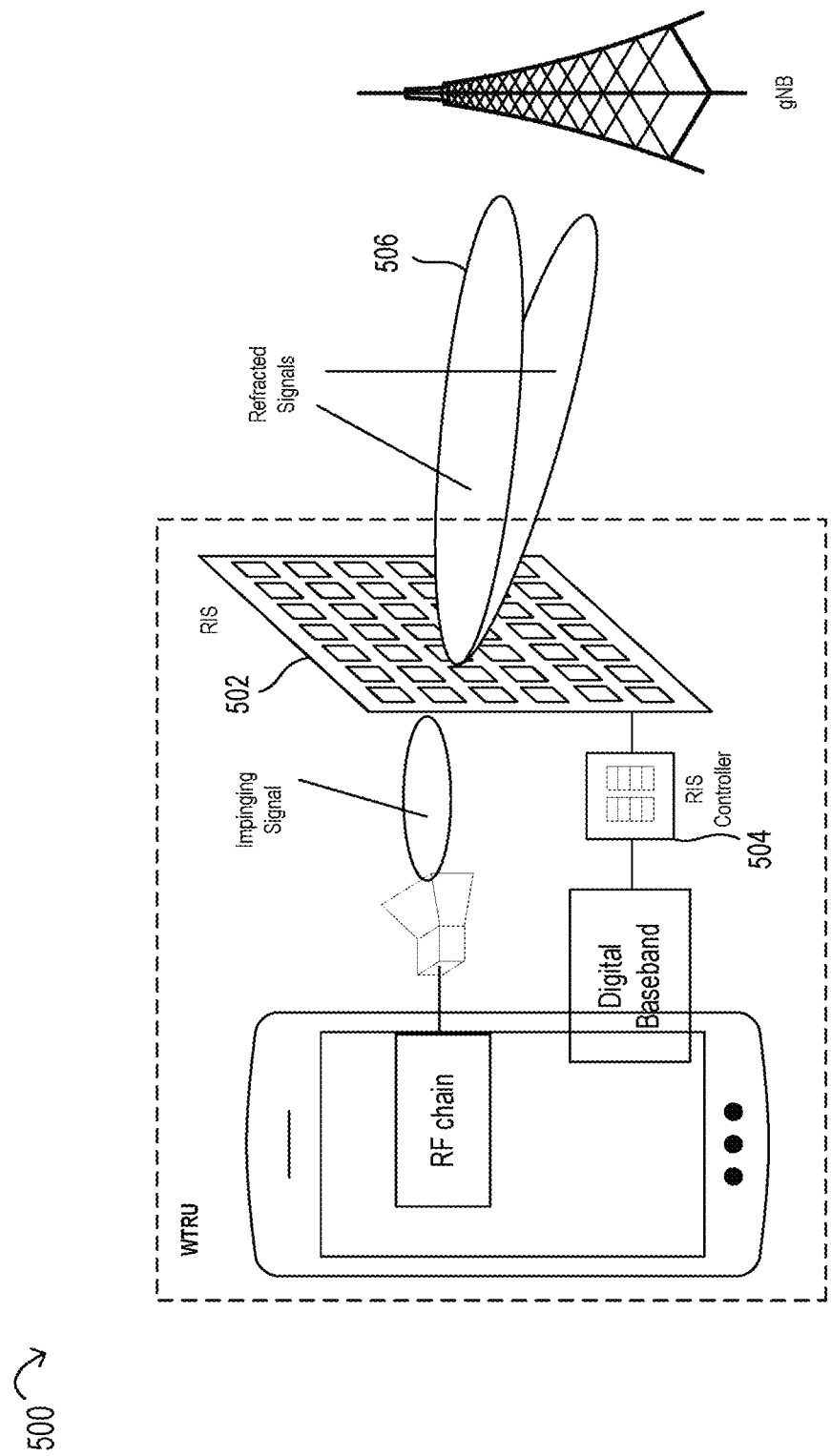
FIG. 5 illustrates an example of a RIS-based mobile terminal.

In an example, the RIS may be integrated on the surface of the mobile terminal. For example, one or more antenna(s) could be placed behind the RIS at the WTRU. The WTRU may be configured to perform RIS-based modulation by controlling the RIS to reflect and/or refract the impinging signal in an appropriate manner. Hence, as FIG. 5 500 illustrates, the antenna (e.g., or antennas) could transmit a signal (e.g., single-tone signal) to the RIS 502 and/or the RIS controller 504 may tune the RIS element(s) for transmission of a modulated and/or beamformed signal 506 to the gNB. In this manner, the modulated signal may be refracted from the RIS surface to the gNB. Note that for the embodiments disclosed herein, the RIS may be controlled to reflect, refract, and/or both reflect and refract impinging signals from a transmitter (e.g., WTRU, gNB, etc.) to a receiver (e.g., gNB, WTRU, etc.).

A RIS may perform modulation that includes RF Chain elements.

Figure 6A:
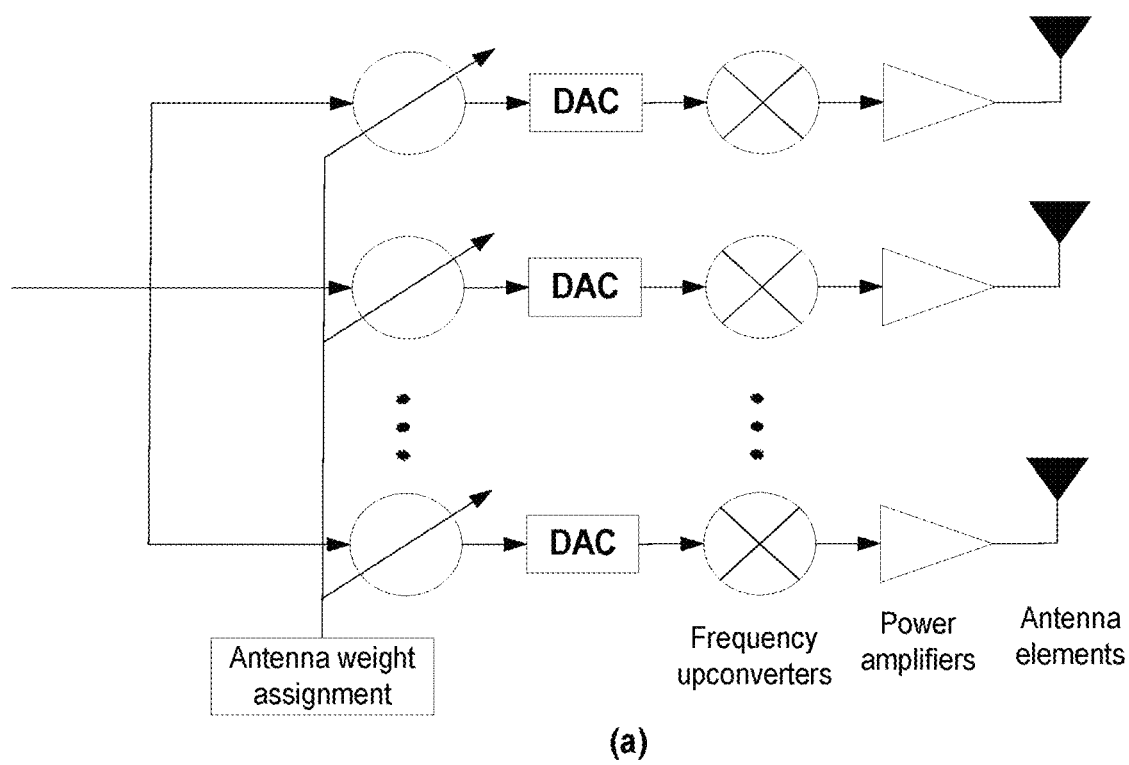
FIG. 6a illustrates an example of a RF chain structure in the modulation with beamformed MIMO.
Figure 6B:
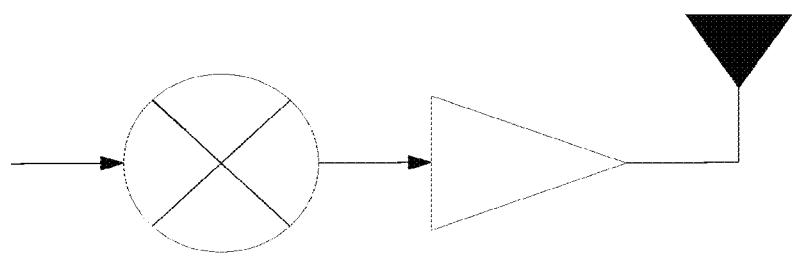
FIG. 6b illustrates an example of a RF chain structure in the RIS-based modulation with beamformed MIMO.

The RF chain utilized in conjunction with a RIS at the transmitter may be different from other RF chains, for example those used in traditional cellular systems or MU-MIMO deployments. The RF chain configuration may be different because the modulation is performed at the RIS, rather than in the RF chain components. For example, the transmitter RF chain may be configured to transmit a signal or tone, for example a single-frequency signal or tone, such as a sine wave. As FIG. 6a illustrates, for example, a digital beamforming architecture 600a may include a chain of components (e.g., the multiple digital-to-analog converters (DAC), and/or upconverters). The chain of components may be utilized to convert the digital baseband signals to radio frequency signals. However, in a RIS-based transmitter, given that the antenna may transmit a signal such as a single-tone signal towards the RIS (e.g., an unmodulated signal such as an unmodulated sine wave), a reduced RF chain can be deployed. As FIG. 6b illustrates, for example, the RF chain 600b may include a frequency upconverter (e.g., a single frequency upconverter), a power amplifier and/or an antenna element (e.g., or multiple elements). The RF Chain 600b may significantly reduce the hardware complexity, cost and/or power consumption (e.g., compared to other system(s)).

A RIS may be configured to apply one or more phase shifts to impinging signals.

The RIS structure may be composed of N electronically controlled RIS element(s). Each element may be capable of modifying the characteristics of impinging signals, for example, where the modified characteristics (e.g., phase shifting, splitting, and/or absorption) appear in the reflected/refracted signal. The RIS phase shift may include the reflected signal (e.g., or refracted signal).

The phase shift of the one or more RIS element(s) may be represented as $\Theta=[\theta_1\ \theta_2\ \ldots\ \theta_N]^T$, where the phase shift of each RIS element may assume to have B-bit resolutions, e.g., the phase shift of each RIS element belongs to the set $$\left\{0, \frac{2\pi}{2^B}, \ldots (2^B-1)\frac{2\pi}{2^B}\right\}.$$

A RIS may be configured to affect or modify the channel between the transmitter and the receiver.

The channel between a RIS with N elements and a receiver equipped with $N_r$ antenna elements may be denoted as $H \in \mathbb{C}^{N_r \times N}$.

The beamforming weights vector $w \in \mathbb{C}^{1 \times N_r}$ may be applied at the transmitter. For example, beamforming may be based on the angles of arrival at the at the receiver as $$w = \left[1, e^{j\frac{2\pi}{\lambda} d \sin \phi}, \ldots, e^{j\frac{2\pi}{\lambda} d(N_r-1) \sin \phi}\right],$$

where d is the distance between the adjacent receive antenna elements. The equivalent channel vector of the link may be given by $g=wH$.

A similar (e.g., the same) concept may be applied to a portion in a RIS, where for a given $n_b$-th portion, the equivalent channel can be expressed as $g_{n_b} = w_{n_b} H_{n_b}$, where $H_{n_b}$ is the channel between the $n_b$-th portion and the receiver.

A RIS/RHS surface may include a plurality of programmable/controllable elements, which may be controlled using a RIS/RHS controller (e.g., dynamically in real-time) in order to manipulate the characteristics of reflected/refracted signals. For example, the RIS elements may be controlled to introduce phase-shift(s) to a reflected/refracted signal. RIS may be controlled in order to modulate (e.g., directly modulate) reflected signals. Additionally or alternatively, RIS may be use for simultaneously attaining beamforming gain (e.g., using the proposed joint modulation and/or beamforming techniques) with relying on single-tone signal (e.g., a sine wave). The proposed scheme(s) may avoid complexities associated with having two or more RF chains.

A RIS/RHS may be controlled by a controller/processor to implement a transmission scheme that combines modulation and beamforming, while relying on a single RF chain with relatively low PAPR. Additionally or alternatively, the RIS/RHS may be controlled to implement one or more multiple types of modulations schemes, such as a RIS-based amplitude-phase shift keying (A-PSK) scheme and/or RIS-based Quadrature amplitude-phase shift keying (QA-PSK) scheme.

A RIS may be configured to perform Joint Beamforming and/or Modulation.

Figure 7:
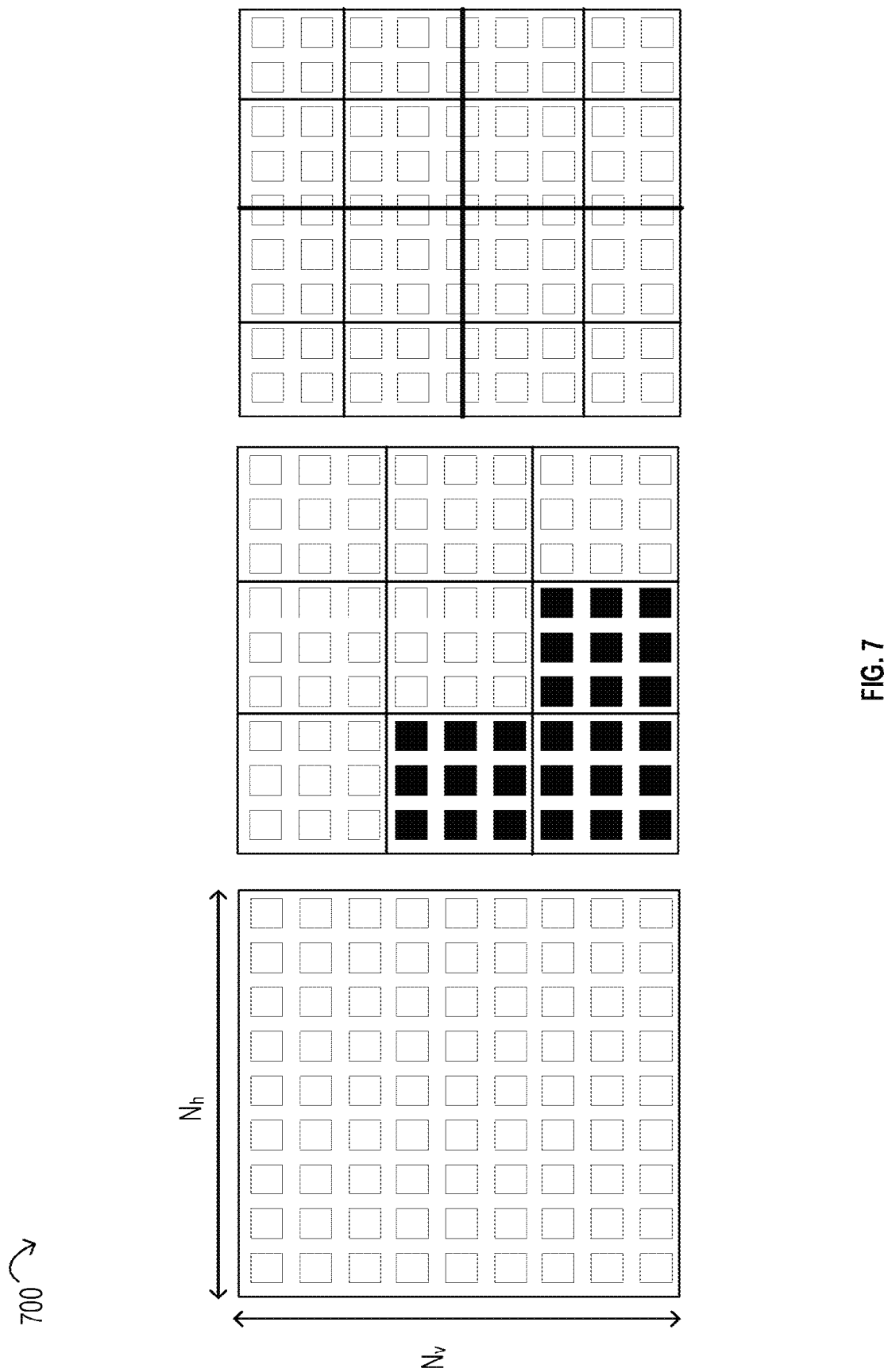
FIG. 7a illustrates an example of a basic RIS structure that depicts the whole RIS.
FIG. 7b illustrates an example of a basic RIS structure that depicts the RIS divided into $N_b$ portions.
FIG. 7c illustrates an example of a basic RIS structure depicting the RIS divided into $N_s$ sections.
Figure 7A:
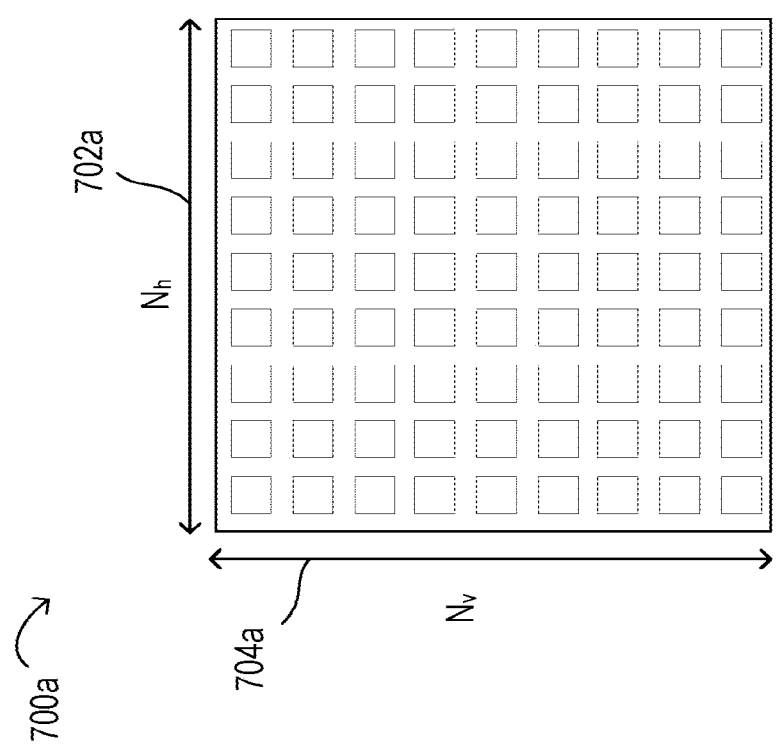
Figure 7B:
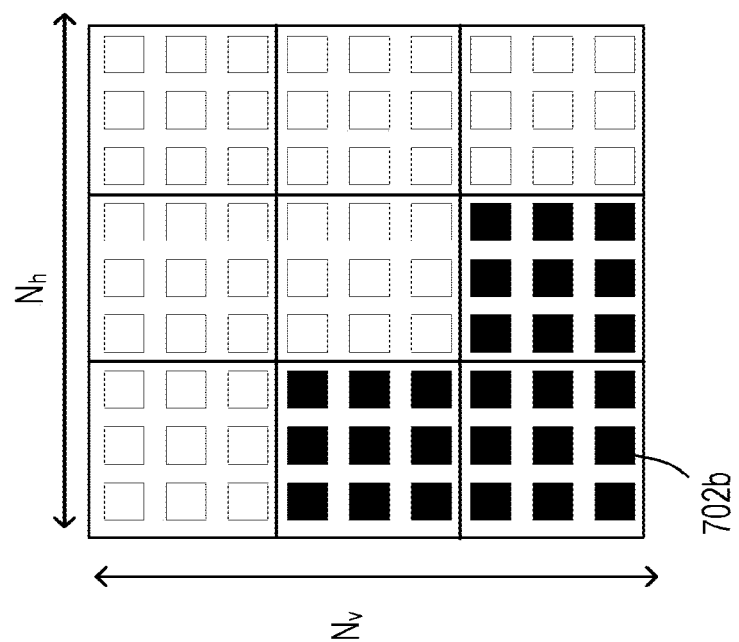

As FIG. 7a illustrates, for example, the RIS structure 700a may include N reflecting elements with $N_h$ element(s) per row 702a and/or $N_v$ element(s) per column 704a. Each RIS element may be controlled (e.g., separately and/or in a portion) in order to manipulate the reflected signal's characteristics, such as by introducing a phase shift $\Theta \in [0, 2\pi]$. As depicted in FIG. 7b, for example, the RIS may be divided into $N_b$ portions (e.g., using the controller), where each portion comprises of $N_e = (N_h^b \times N_v^b)$ elements. The RIS controller may switch ON and/or OFF one or more element(s) or one or more portion(s) in the RIS. For example, the elements/portions colored in grey 702b in FIG. 7b, illustrate(s) active elements/portions (e.g., ON state). The elements/portions shown in white in FIG. 7b, for example, illustrate the inactive elements/portions (e.g., OFF state).

A group of portions may denote a combination of portions that can be switched ON and/or OFF together. As FIG. 7c illustrates, the RIS controller may further divide the RIS into sections 700c, for example, where each section 702c may include one or more portions and/or may be independent from other (e.g., all other) sections. Dividing the RIS into multiple sections may allow the RIS-based transmitter to utilize each section separately from the other section(s).

Figure 8:
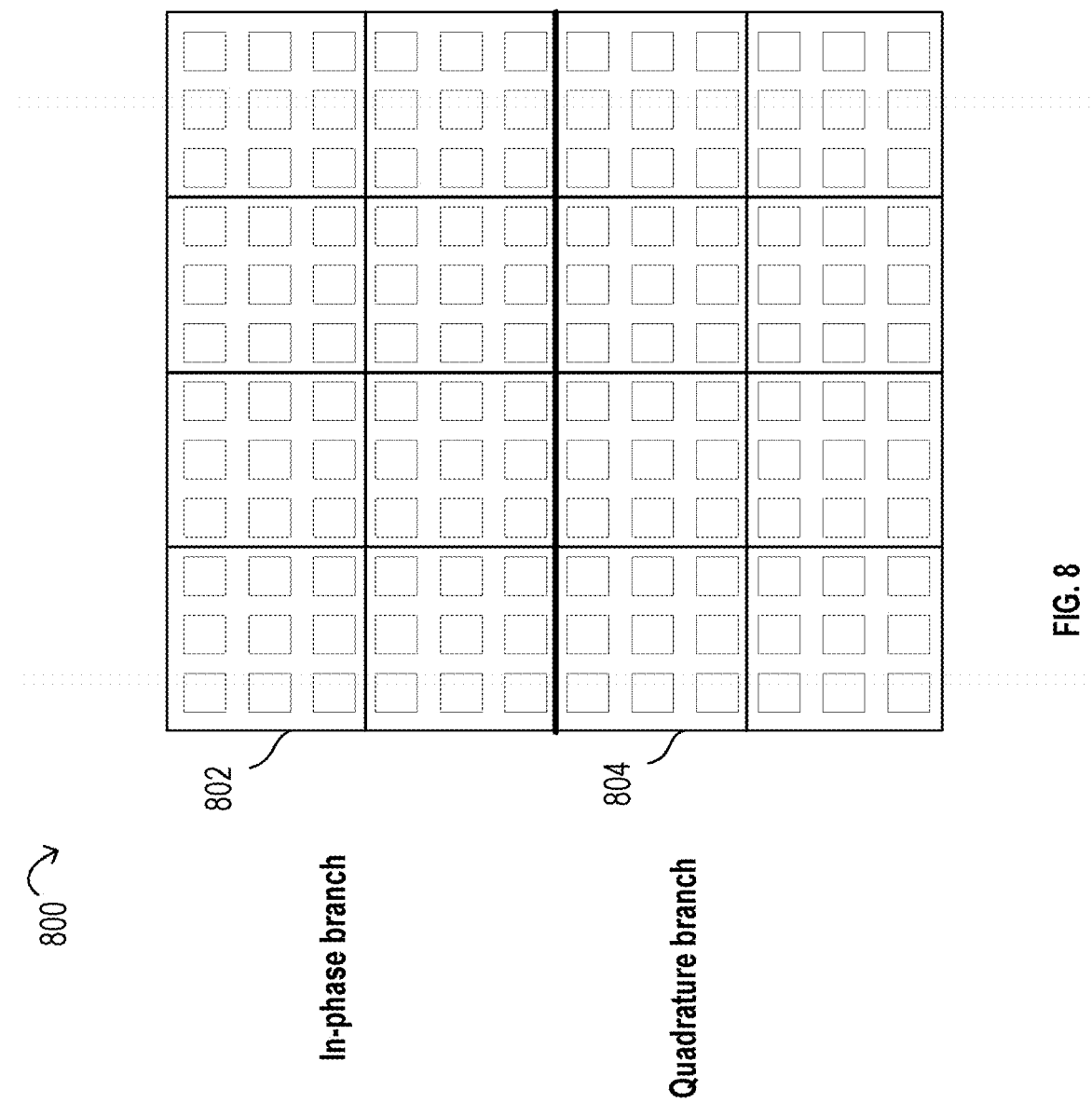
FIG. 8 illustrates an example of a RIS divided into In-phase and Quadrature branches.

A RIS may be divided in to one or more RIS branches. For example, the branches may be utilized in order to implement quadrature modulation. As FIG. 8 illustrates, for example, a RIS may be divided into two or more branches 800, such as an in-phase branch 802 and/or a quadrature branch 804. Division of the RIS may enable the RIS-based transmitter to transmit in-phase and/or quadrature components in the in-phase 802 and/or quadrature branches 804, correspondingly. Each branch may be further divided into one or more portions, where each portion/group of portions may be switched ON or OFF.

A RIS may be configured to perform modulation that includes a transmission scheme.

Figure 9:
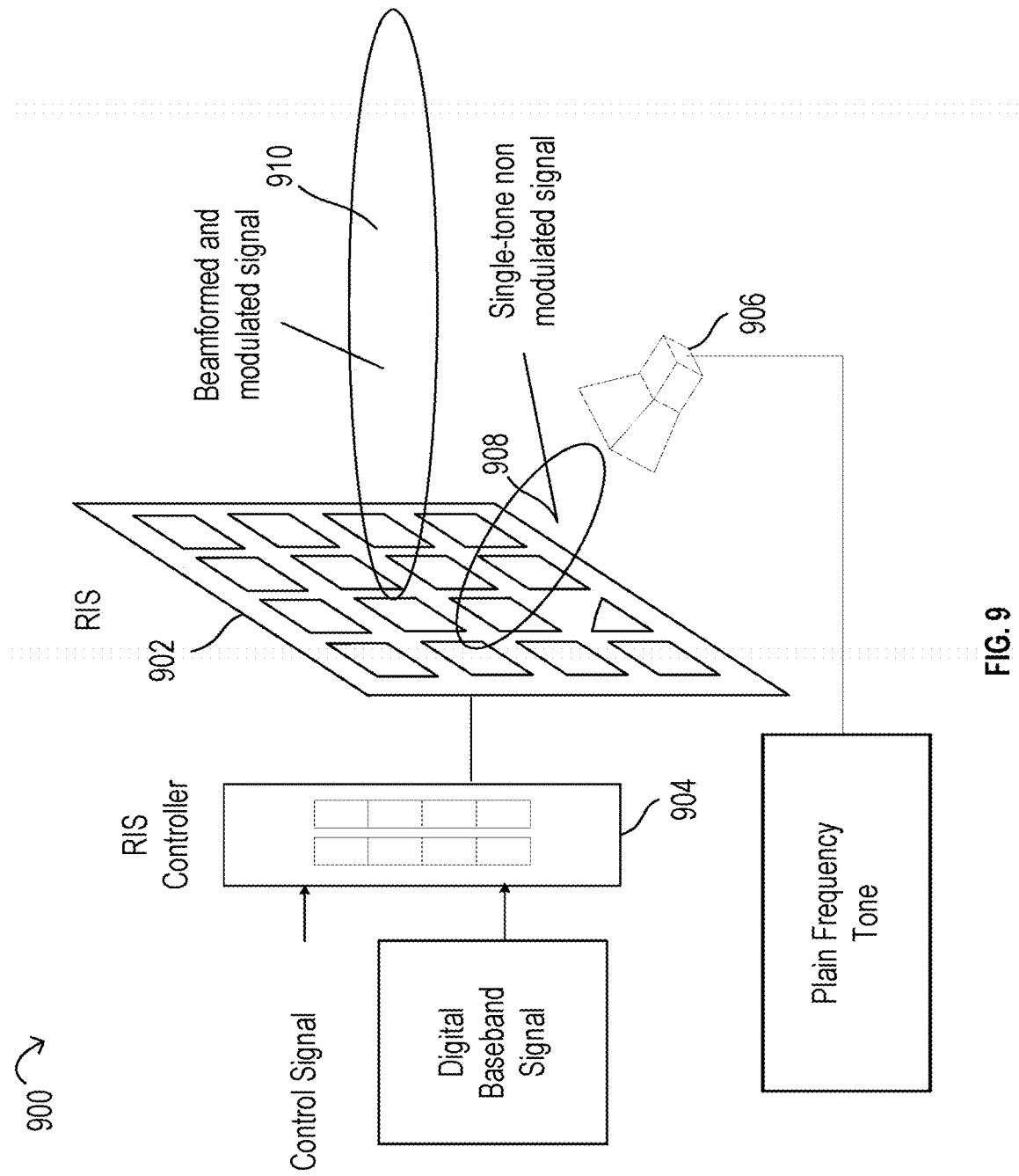
FIG. 9 illustrates an example of a RIS-based joint beamforming and modulation.

FIG. 9 illustrates an example of the RIS-based transmitter portion diagram 900. The RIS-based transmitter portion diagram 900 may include, for example, a RIS 902, a RIS controller 904, and/or a single RF chain 906 with a single antenna (e.g., multiple antennas may be employed). The RF chain 906 may generate a single-tone signal 908 (e.g., unmodulated sine wave) and/or transmit the single-tone signal 908 (e.g., unmodulated sine wave) towards the RIS 902. The RIS 902 may introduce the modulation information into the reflected signal 910 with the aid of the controller 904. The controller 904 may be implemented using a processor and memory. The controller 904 may tune the RIS elements and/or modify the reflected signal characteristics, for example, based on an input information (e.g., input bits) and/or a control signal. The control signal may be fed into the RIS controller 904 to provide beamforming weights and/or further control to the RIS 902 (e.g., RIS division, switch RIS elements/portions ON and/or OFF, etc.). Hence, the RIS-based transmitter may modulate information in the reflected signal. Additionally or alternatively, the RIS components may allow the transmitter to simultaneously attain a beamforming gain. FIG. 5, for example, illustrates the transmitter being deployed at the WTRU.

A proposed RIS-based transmission may utilize both amplitude and/or phase components using passive RIS elements. The amplitude component of the modulation may be realized using beamforming gain, for example, given that passive RIS structures may not include active components. A RIS-based transmission that utilizes both amplitude and/or phase components using passive RIS elements may be applied for both data/information symbol and/or reference signal (e.g., pilot signal) transmission.

A RIS may be configured to perform signal modulation that includes an amplitude component.

To utilize the amplitude component in the modulation, the RIS may be divided into one or more portions. FIG. 10 illustrates, for example, a RIS divided into one or more portions 1000. In examples, a specific combination of portions may be active in a transmission (e.g., single transmission). A beamforming gain may be achieved for example, by activating a single portion and/or a group of portions. The beamforming gain may be proportional to the number of elements in the active portions. For example, activating portions 1 1010, 4 1020 and 7 1030 in FIG. 10, while deactivating other (e.g., all other) portions may allow modulating the reflected signal, using the three activated portions, and/or attaining a beamforming gain that is proportional to the number of elements in the activated portions.

Figure 11:
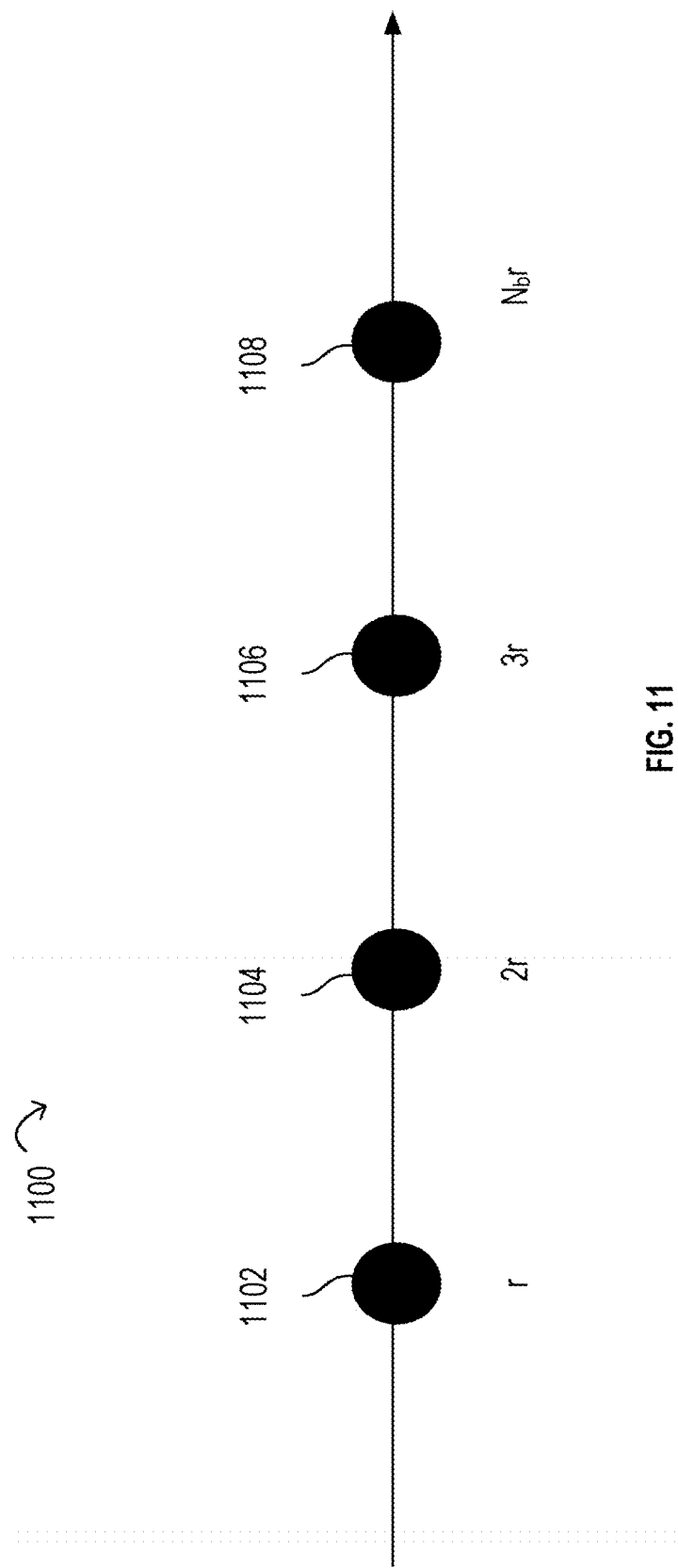
FIG. 11 illustrates an example of the information being represented by activating multiple RIS portions.

An amplitude component may be transmitted over the collective gains of active RIS portions. A beamforming gain may be proportional to $N_e$, for example, if a single portion with $N_e$ elements is active. The amplitude information for a single portion with $N_e$ active elements, for example, may be denoted by: $r \propto N_e$. The beamforming gain may be proportional to $N_b$, $N_e$, for example, if $N_b$ portions (e.g., each with $N_e$ elements) are active. The amplitude information denoted by this portion may be: $N_b r$, for example, if $N_b$ portions (e.g., each with $N_e$ elements) are active. FIG. 11 illustrates, for example, the relationship between the portion gain and amplitude information 1100. FIG. 11 depicts, for example, four amplitude levels: r 1102, 2r 1104, 3r 1106 and $N_b r$ 1108 indicating that 1, 2, 3 and $N_b$ portions are active for each point.

A RIS-based transmission may not endure any power amplifier back-off with no PAPR (e.g., as in QAM), for example, by relying on the beamforming gain (e.g., of active portions) to represent the modulation amplitude.

In examples, the RIS may not be divided into one or more predefined portions (e.g., to activate one or more portions and/or deactivate one or more other portions). In examples, a subset (e.g., specific subset) of RIS elements may be activated in order to achieve a beamforming gain (e.g., a specific beamforming gain). The collective beamforming gain of the active portions may denote a specific amplitude information. The amplitude levels shown in FIG. 11, for example, may be achieved by activating a different combination of RIS elements for each amplitude level (e.g., r, 2r, 3r, . . . , $N_b r$).

A RIS may be configured to perform signal modulation that includes a phase shift.

Figure 12:
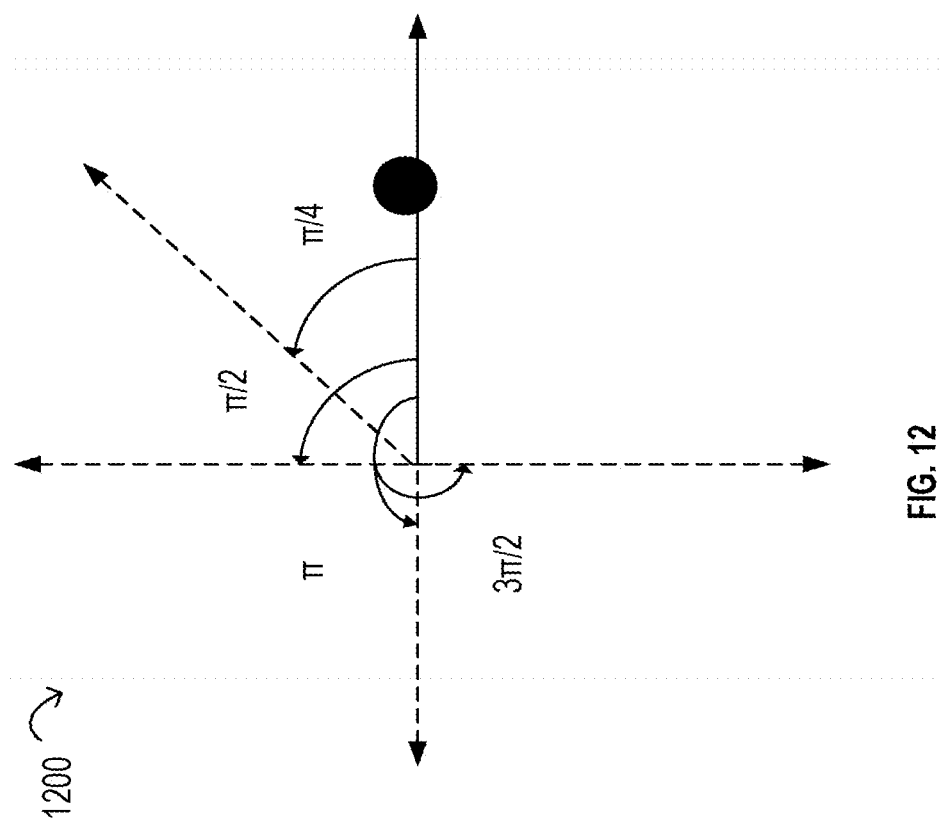
FIG. 12 illustrates an example of phase shifts of RIS elements.

Each of the elements (e.g., in the active portions) may manipulate the characteristic(s) of reflected/refracted signals, for example in order to achieve a phase-shift. As an example, the electronically programmable/controllable elements of the active portions of the RIS may be controlled in order to achieve a desired phase shift for the reflected/refracted signal. The RIS elements may introduce a phase shift to the reflected signals. As FIG. 12 depicts, for example, the RIS elements in the active portions may tune the reflected signals towards one or more (e.g., four) phases 1200

$$\left(e.g., \frac{\pi}{4}, \frac{\pi}{2}, \pi \text{ and } \frac{3\pi}{2}\right).$$

In examples, a phase shift may carry the phase shift information of the modulation. In examples, the amplitude and phase components may be combined to produce a RIS-based constellation.

In examples, the baseband processor may feed (e.g., mainly feed) two or more information streams to the RIS controller. The information streams to the RIS controller may include the ON/OFF map information of RIS portions/elements (e.g., which translates to amplitude components). The information streams to the RIS controller may include the phase-shift information for each of the active RIS elements.

In examples, any of the modulation schemes may be employed (e.g., PSK, QAM) with any constellation size, for example, via using the proposed architecture. In examples, the baseband processor may obtain the information for the amplitude information (e.g., ON/OFF RIS elements/portions) and/or phase information. In examples, the baseband processor may forward the amplitude and/or phase information to the RIS controller. In examples, the controller may tune the one or more RIS elements accordingly (e.g., so that the modulation is applied on the reflected signal). Tuning may include controlling which portions of the RIS are active and controlling the phase shift(s) to be applied by the active portions of the RIS.

A RIS may be configured to perform signal modulation that includes a MIMO Transmission.

Figure 13:
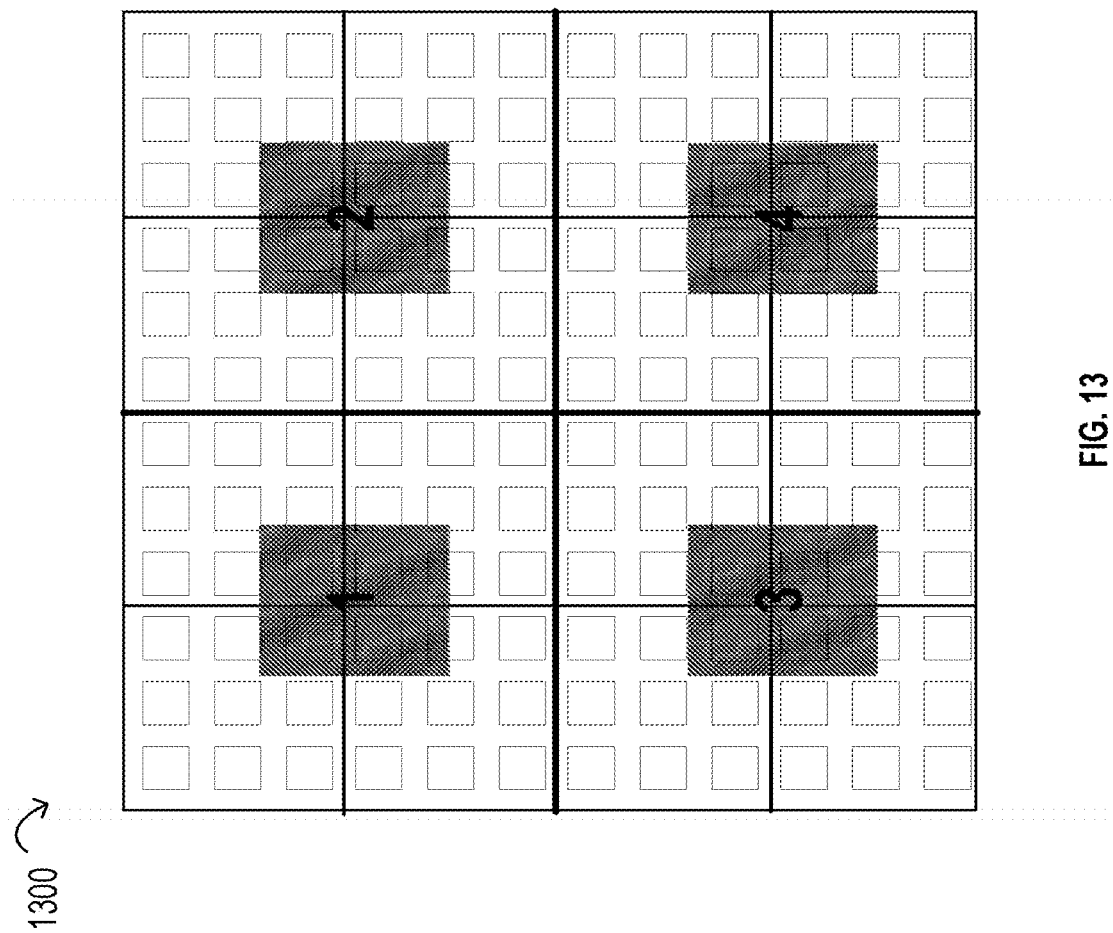
FIG. 13 illustrates an example of the extension of the RIS division into multiple section(s) for transmitting separate streams.

The MI MO transmission scheme may be further extended to support MIMO functionalities (e.g., multiplexing A-PSK symbols). For example, a RIS structure may be divided into two or more (e.g., multiple) sections, where each section can handle an independent symbol transmission. FIG. 13, for example, illustrates a RIS that is divided into four sections 1300. In examples, a separate A-PSK symbol(s) (e.g., the same A-PSK symbol(s) and/or a different A-PSK symbol(s)) may be transmitted from each respective section. In examples, the A-PSK transmission procedure may be performed in each section separately (e.g., each section is divided into multiple portions in order to perform the proposed RIS-based transmission scheme). In this manner, each section may be used to generate a respective modulated symbol, for example by selectively activating and/or applying phase shift(s) to the impinging signal for that section. The resulting reflected signal from the section may be a modulated and/or beamformed signal.

A RIS may be configured to perform signal modulation that includes Reference Signal Transmission.

The WTRU may include the channel information between the RIS and the WTRU in the downlink, for example, in order to demodulate the RIS-based signal. Demodulating the RIS-based signal may be achieved, for example, by pausing the modulation at the RIS so the WTRU receives a plain signal (e.g., single tone) so the transmitter (e.g. gNB or WTRU) acquires the channel information. Thus, a reference signal may be transmitted by activating one or more (e.g., or all) portions of the RIS and refraining from applying a phase shift using the RIS elements.

Figure 14:
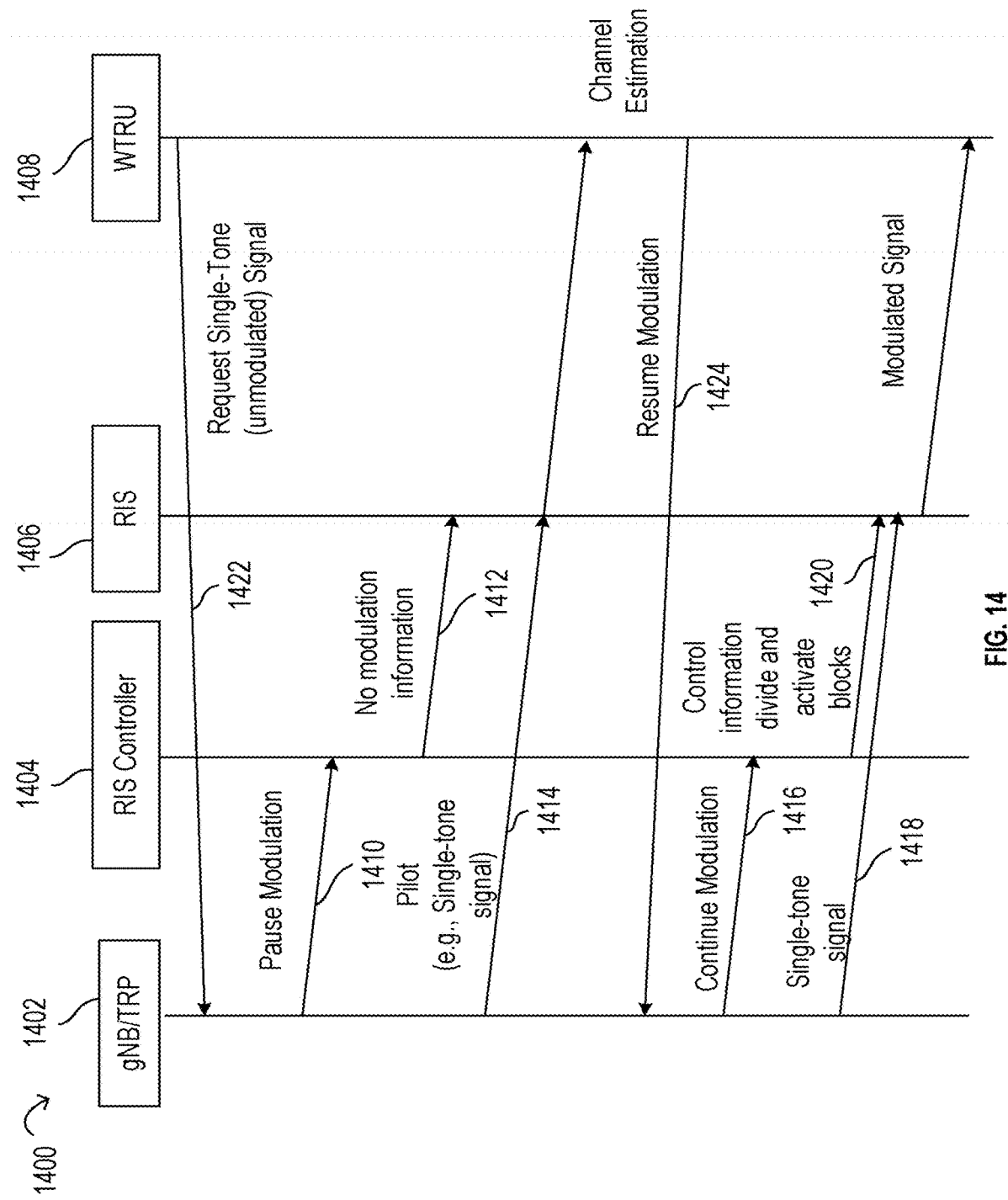
FIG. 14 illustrates an example of the reference signal for channel estimation at the WTRU.

FIG. 14 illustrates, for example, demodulation of the RIS-based signal 1400. In examples, the gNB/TRP 1402, RIS controller 1404 and/or RIS 1406 may be collocated. In examples, a similar (e.g., same) process may be applied when the RIS/RHS-based transmitter is employed at the WTRU side.

In examples, the WTRU 1408 may transmit a message 1422 to the gNB/TRP 1402. The message 1422 may indicate (e.g., include) one or more signal(s) to the gNB/TRP 1402. The signal(s) may indicate (e.g., include) one or more request(s). The request(s) may indicate (e.g., include) a message to request single-tone (e.g., unmodulated) signal. The request(s) may indicate (e.g., include) a message to pause the modulation process. In examples, pausing the modulation process and/or requesting single-tone/unmodulated signal may be for channel estimation.

In examples, the gNB/TRP 1402 may transmit a message 1410 to the RIS Controller 1404. The message 1410 may indicate (e.g., include) one or more signal(s) to the RIS controller. The signal(s) may indicate (e.g., include) a message to pause the modulation process. In examples, the RIS controller 1404 may pause the modulation at the RIS 1406. Pausing the modulation process may include terminating the modulation signal transmission.

In examples, the RIS Controller 1404 may transmit a message 1412 to the RIS 1406. The message 1412 may indicate (e.g., include) no modulation information.

In examples, the gNB/TRP 1402 may transmit a message 1414 to the WTRU 1408. The message 1414 may indicate (e.g., include) a pilot (e.g., single-tone and/or unmodulated) signal).

In examples, the WTRU 1408 transmit a message 1424 to the gNB/TRP 1402. The message may indicate (e.g., include) a request. The request may indicate (e.g., include) a message to resume the modulation.

In examples, the WTRU 1408 may estimate the channel. In examples, the WTRU may use the non-modulated signal to estimate the channel.

In examples, the WTRU may transmit a message to the gNB. The message may indicate (e.g., include) a signal. The signal may indicate (e.g., include) the gNB to resume modulation signal transmission.

In examples, the gNB/TRP 1402 may transmit a message 1416 to the RIS controller 1404. The message 1416 may indicate (e.g., include) a signal. The signal may indicate (e.g., include) the RIS 1406 to resume modulation.

In examples, the RIS 1406 may resume modulating the one or more reflected signal(s). The WTRU 1408 may demodulate the signal(s), for example, by using the pilot symbol.

In examples, the gNB/TRP 1402 may transmit a message 1418 to the RIS 1406. The message 1418 may indicate (e.g., include) a single-tone signal. In examples, the gNB/TRP 1402 may transmit a message to the RIS. The message may indicate (e.g., include) a signal to resume modulation. In examples, the gNB/TRP 1402 may transmit the signal through a control link. In examples, the control link may be between the gNB/TRP 1402 and the RIS controller 1404. In examples, the gNB/TRP 1402 may transmit side control information to the RIS controller (e.g., through the control link). In examples, the side control information may include ON/OFF and/or pause/resume type of information.

In examples, the gNB/TRP 1402 may transmit a message to the RIS Controller 1404. The message 1418 may indicate (e.g., include) to continue modulation.

In examples, the RIS controller 1404 may transmit a message 1420 to the RIS 1406. The message 1420 may indicate (e.g., include) control information to divide and/or activate portions in the RIS.

A RIS may be configured to perform signal modulation that includes joint amplitude-phase shift keying (e.g., A-PSK) and/or beamforming.

In examples, the phase and/or amplitude dimensions may be used for the RIS-based amplitude-phase shift keying (e.g., A-PSK). In examples, information may be conveyed over the amplitude and/or phase shifts of modulated signals. In examples, the tunability of RIS elements may be utilized for modulating information on a single-tone signal reflecting on the RIS surface. Modulation of information may be achieved by tuning the RIS elements' phase shifts and/or exploiting the RIS elements' amplitude gains. Modulation of information may increase spectral efficiency (e.g., while employing a single RF chain).

In an A-PSK, for example, the RIS (e.g., entire RIS) may be divided into portions, where a specific combination of portions is active (e.g., the remaining portions are switched off). The information may be transmitted over both phase and/or amplitude component(s). In examples, the gain of the active RIS portions (e.g., which differs from one combination to another) may define the amplitude. In examples, the phase shift(s) applied to the active elements (e.g., in the active portions) may define the phase component(s).

A RIS may be configured to perform signal modulation that includes an A-PSK method.

In examples, for a given M-ary A-PSK modulation, there may be a total of M/V amplitude components and/or V phase components. Together they may construct the M-ary beamformed modulation (e.g., transmits $\log_2 M$ bits).

The RIS may be divided into a plurality of RIS portions that can—when dividing into multiple combinations—achieve M/V amplitude levels, for example, to obtain M/V amplitude components. In examples, the RIS may be partitioned into $$N_b = \frac{M}{V}$$

portions denoted by $B_1, \ldots B_{M/V}$, where each portion contains $$N_e = \frac{NV}{M}$$

elements. Portions $B_1$ to $B_i$ may be activated, for example, to generate a symbol having an i amplitude. The RIS may be partitioned into portions with different shapes (e.g., rectangular, square). Additionally or alternatively, the number of portions utilized for attaining M/V amplitude components may be different from M/V portions. Additionally or alternatively, the number of elements in one portion may be different from the number of elements in a different portion.

The beamforming weights vector for each portion may be expressed as $w_1, \ldots w_{M/V}$. The equivalent channel between each portion and the receiver may be expressed as $g_1, \ldots, g_{M/V}$, for example, given that the $n_b$-th equivalent channel is given by $g_{n_b} = w_{n_b} H_{n_b}$ (e.g., $H_{n_b}$ is the channel between the $n_b$-th portion and the receiver). The beamforming weights vectors may be applied for data/information symbol and/or reference signal (e.g., pilot signal).

In examples, different beamforming weights for each portion $w_i$ may generate a single beam for the RIS (e.g., using the active portions). The beamforming gain may be proportional to the number of active portions. The beamforming gain may be proportional to $N_A N_e$, for example, if $N_A$ portions are active where each portion includes $N_e$ RIS elements. As FIG. 11 illustrates, for example, more beamforming gain may be attained as a result of more portions that are activated. Employing different beamforming weights may be applied for data/information symbol and/or reference signal (e.g., pilot signal).

A RIS may be configured to perform signal modulation that includes M-ary information. The M-ary information may be transmitted over the amplitude and/or phase components.

A RIS may be configured to perform signal modulation that includes M-ary information transmitted over the amplitude component. In examples, for each transmission, a combination of l RIS portions may be active (e.g., ON-state) attaining a distinct amplitude level, given that l=1, ..., M/V.

In examples, to attain a distinct amplitude level, for example, a combination of portions (e.g., that collectively achieve a distinct channel gain) may be activated, while other portions are deactivated (e.g., switched off). For example, the portions $B_1, \ldots, B_l$ may be activated (e.g., ON-State), while the portions $B_{l+1}, \ldots, B_{M/V}$ are deactivated (e.g., OFF-state). In examples, for a given l, the amplitude component may be equivalent to the aggregated gain of the l active RIS portions.

A RIS may be configured to perform signal modulation that includes M-ary information transmitted over the phase component.

V-ary information may be conveyed over the phase component. In examples, each transmission the RIS elements (e.g., in the active RIS portions) may switch to the respective v-th phase shift, where v=0, . . . , V−1. In examples, the v-th phase shift may be applied to the reflected (e.g., modulated and/or beamformed) signal. In examples, V may be chosen as a divisor of $2^B$, for example, in order to avoid any RIS phase matching (e.g., where $\log_2 V$ is an integer not larger than B).

In examples, in active RIS portions, the RIS phase shift of the ON-state portions $B_1, \ldots, B_l$, may be denoted as $\Theta_1, \ldots, \Theta_l$. The denotation may be given by $$\Theta_{(1:l)}^T = \angle_B\left(e^{j\frac{2\pi v}{V}} g_{(1:l)}^H\right) = e^{j\frac{2\pi v}{V}} \angle_B\left(g_{(1:l)}^H\right),$$

where $\theta_{(1:l)}=[\Theta_1, \ldots, \Theta_l]$, $g_{(1:l)}=[g_1, \ldots, g_l]$, and $\angle_B(.)$ is the angle operator with a resolution of B bits (e.g., the angle operator retrieves angles of a vector with a step of $$\frac{2\pi}{B}\Big).$$

In examples, it may be seen in the formula of $\Theta_{(1:l)}^T$, that an M-ary information symbol can be transmitted by choosing (e.g., appropriately choosing) the values of l and v. In examples, for a reference signal, the v may be fixed. In examples, for a reference signal, the received side may obtain the effective channel gain.

A RIS may be configured to perform signal modulation that includes M-ary information transmitted over the combined phase and amplitude components.

In examples, the beamformed constellation may be expressed as $$\mathcal{M}_{A\frac{V}{M}} = \left\{ e^{j\frac{2\pi v}{V}} \sum_{l'=1}^{l} X_{l'} \,\bigg|\, v = 0, 1, \ldots, V-1; l = 1, \ldots, \frac{M}{V} \right\},$$

for example, given that information is jointly beamformed and/or modulated in the A-PSK scheme (e.g., over phase and amplitude). The beamformed constellation may include the set of all symbols in the constellation. The beamformed constellation may include a phase component. The phase component for each value of l and/or v may denoted by $$e^{j\frac{2\pi v}{V}}.$$

The phase component may include a value of l that denotes the amplitude component (e.g., for each symbol). The phase component may include a value of v that denotes the phase shift component (e.g., for each symbol). In examples, $X_l = g_l \cdot \Theta_l$, may represent the channel gain (e.g., also the amplitude component) of the portion $B_l$. In examples, the beamformed constellation may be referred to as $A_{M/V}^V$.

A RIS may be configured to perform signal modulation that includes A-PSK MIMO transmission.

As FIGS. 7a, 7b, and 7c illustrate, for example, the RIS configured to perform signal modulation that includes A-PSK may be extended to a multiple symbol transmission by dividing the RIS into $N_s$ sections (e.g., $N_s$ is equivalent to the number of A-PSK symbols). In examples, an independent A-PSK modulation with beamforming may be carried out in each section separately.

Figure 15:
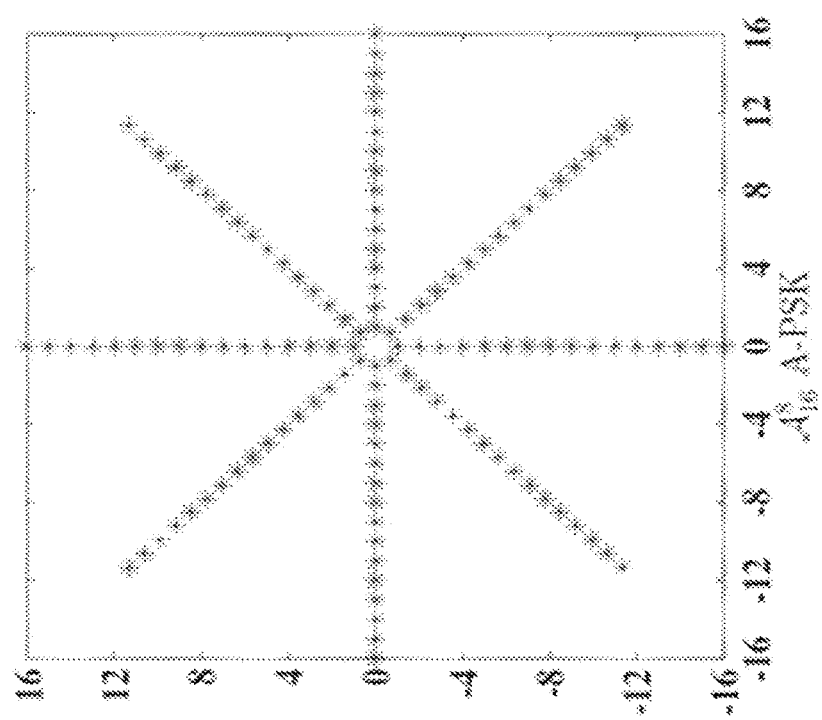
FIG. 15 illustrates an example of the statistical CSI-based received signal constellation in the proposed RIS-based $A_{16}^8$ A-PSK scheme.

FIG. 15 illustrates an example of an A-PSK constellation scheme 1500. The constellation may be associated with M=128 having V=8 phase shifts and/or $$\frac{M}{V} = \frac{128}{8} = 16$$

amplitude levels. The example of the constellation depicted in FIG. 15 may be referred to as $A_{16}^8$ A-PSK 1500.

Another example may be given in Table 1 of an A-PSK scheme with 4-level amplitude (e.g., 4 combinations of RIS portions) and/or 4-phase shifts (e.g., $$\frac{\pi}{2}$$

phase shift spacings).

TABLE 1

An example of 16-ary information modulation of A-PSK, including 4-ary amplitude information and 4-ary phase information (e.g., phase shifts can be separately applied to each portion).

| Amplitude information | ON/OFF-state of portions |
| --- | --- |
| l = 1 | ON: 1; OFF: 2,3,4 |
| l = 2 | ON: 1,2; OFF: 3,4 |
| l = 3 | ON: 1,2,3; OFF: 4 |
| l = 4 | ON: 1,2,3,4; OFF: — |
| phase information | Phase shift |
| v = 0 | 0 |
| v = 1 | $\frac{\pi}{2}$ |
| v = 2 | $\pi$ |
| v = 3 | $\frac{3\pi}{2}$ |

Figure 16A:
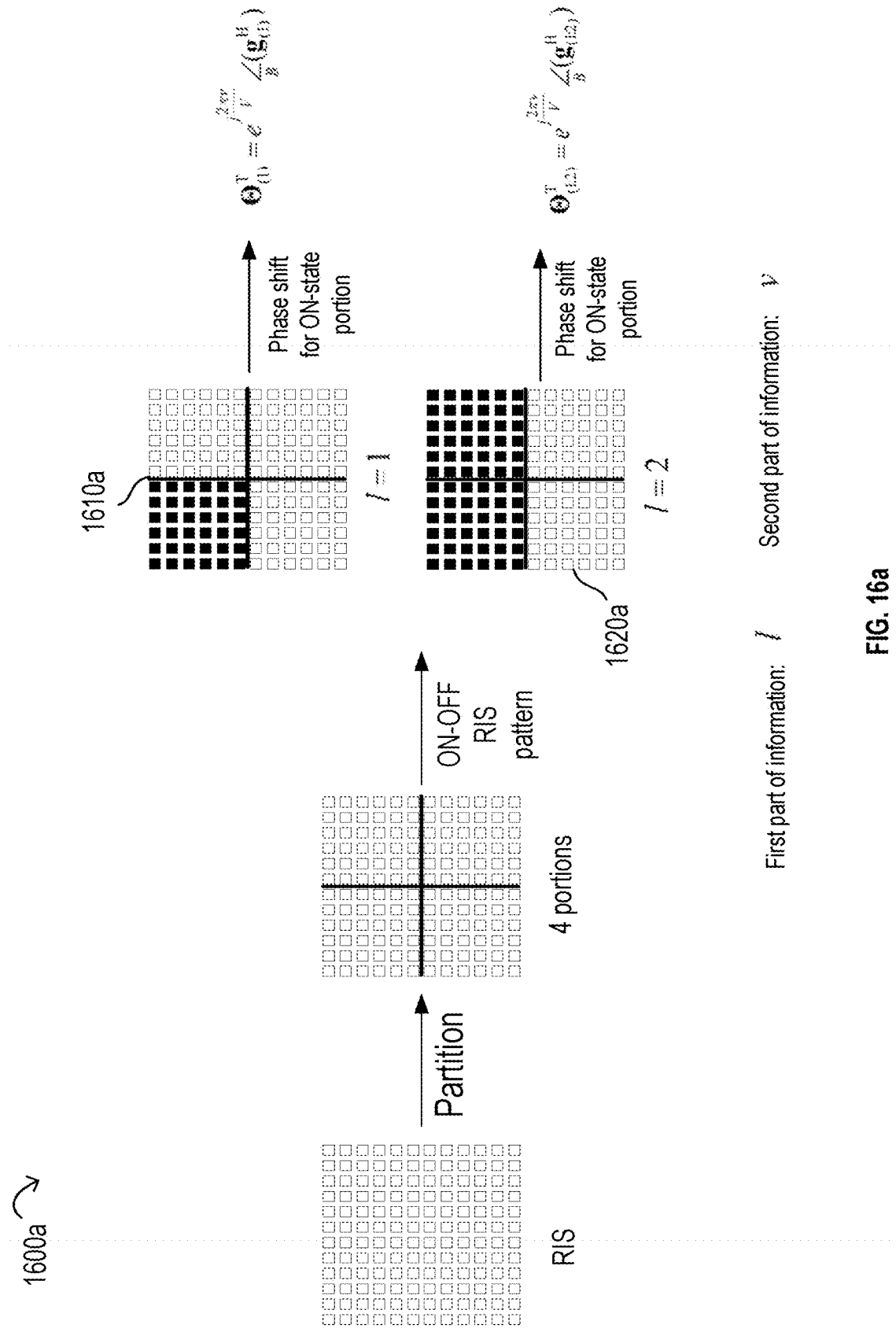
FIGS. 16a and 16b illustrate an example showing a RIS-based A-PSK modulation with 4 portions.
Figure 16B:
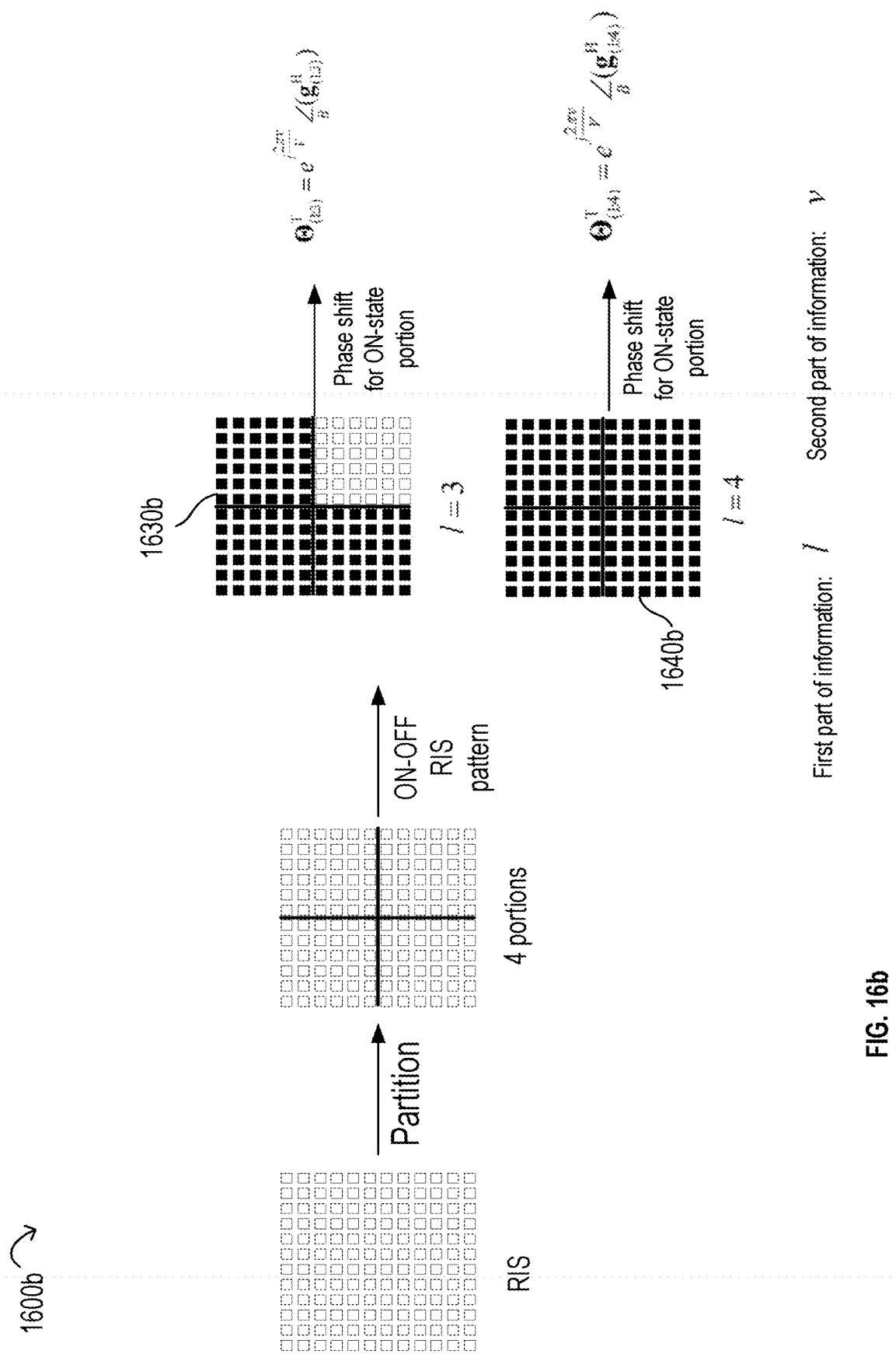

FIGS. 16a and 16b further depict the example as provided in Table 1, where the RIS may be divided into $$N_b = B_{\frac{M}{V}} = 4$$

portions. Four portion groups/combinations may be constructed, for example, via using the four portions. The four portion groups/combinations may be denoted by l=1, 2, 3, . . . 4. The portions may be activated as follows:

In examples, portion 1 may be ON and/or blocks 2, 3, and/or 4 may be OFF when l=1 1610a.

In examples, portions 1 and 2 may be ON and/or blocks 3, and/or 4 may be OFF when l=2 1620a.

In examples, portions 1, 2, and 3 may be ON and/or block 4 may be OFF when l=3 1630b.

In examples, portions 1, 2, 3, and 4 may be ON when l=4 1640b.

In examples, elements in each portion may be tuned to the respective phase shift(s) in Table 1 and/or the beamforming weight(s), as shown in FIGS. 16a 1600a and 16b 1600b, for example, based on the input information bits. In examples, each of the four combinations may achieve a specific gain (e.g., amplitude). In examples, the active portions combination and/or the phase shift employed may achieve a specific amplitude and/or a range of phase shifts.

A RIS may be configured to perform signal modulation that includes Joint Quadrature Amplitude-Phase Shift Keying Modulation and/or beamforming.

In examples, the quadrature and/or in-phase dimensions may be used for the RIS-based quadrature amplitude-phase shift keying (QA-PSK). In examples, information may be conveyed over the quadrature and/or in-phase component(s) of modulated signal(s).

A RIS may be configured to perform signal modulation that includes a QA-PSK method.

In examples, for a given M-ary QA-PSK modulation, the information may be transmitted over two or more branches (e.g., in-phase, quadrature). The in-phase and/or quadrature branches may jointly convey information over the amplitude and/or phase component(s). In examples, there may be a total of $$\sqrt{\frac{M}{V}}$$

amplitude components in in-phase and/or $$\sqrt{\frac{M}{V}}$$

amplitude components in quadrature, and/or there may be V phase shifts in the quadrature and/or in-phase branch(es). The total number of constellation points generated may be determined by multiplying available (e.g., all available) amplitude and phase components as:

$$\sqrt{\frac{M}{V}} \times \sqrt{\frac{M}{V}} \times V = M$$

points, for example, since the information is jointly conveyed over the in-phase and quadrature branches.

In examples, the entire RIS portion may be divided into two or more branches (e.g., each branch has a plurality of portions), for example, in order to have an in-phase and/or quadrature information. The two or more portions may be denoted as the in-phase (I-) branch and the quadrature (Q-) branch. In examples, each branch may contain $$\frac{N}{2}$$

RIS elements.

In examples, the in-phase and/or quadrature branch(es) may be divided into a plurality of RIS portions in order to attain, for example, $$\sqrt{\frac{M}{V}}$$

amplitude levels in I and Q branches. A plurality of RIS portions may construct $$\sqrt{\frac{M}{V}}$$

amplitude levels. In examples, each branch may be divided into $$\sqrt{\frac{M}{V}}$$

portions denoted as $$B^I \sqrt{\frac{M}{V}}$$

for the I-branch $$B^Q \sqrt{\frac{M}{V}}$$

for the Q-branch. In examples, each portion the I-branch and/or Q-branch may contain $$\frac{N}{2}\sqrt{\frac{V}{M}}$$

elements.

In examples, the beamforming weights vectors for the portions in the I-branch may be expressed as $$w^I \sqrt{\frac{M}{V}}.$$

The equivalent channel between each portion in the I-branch and the receiver may be denoted by $$g^I \sqrt{\frac{M}{V}},$$

where the $n_b$-th equivalent channel in I-branch in given by $g_{n_b}^I = w_{n_b}^I H_{n_b}^I$.

In examples, the beamforming weights vectors for portions in the Q-branch may be expressed as $$w^Q \sqrt{\frac{M}{V}}.$$

The equivalent channel between each portion in the Q-branch and the receiver may be denoted by $$g^Q \sqrt{\frac{M}{V}},$$

where the $n_b$-th equivalent channel in Q-branch is given by $g_{n_b}^Q = w_{n_b}^Q H_{n_b}^Q$.

In examples, the beamforming weights vectors may be applied for data/information symbol and/or reference signal (e.g., pilot signal).

In examples A RIS may be configured to perform signal modulation that includes a M-ary modulation and/or QA-PSK method. The M-ary modulation may constitute an amplitude component and/or a phase component.

A RIS may be configured to perform signal modulation that includes an amplitude component of the M-ary modulation.

In examples, for each symbol, a combination of $l_1$ portions may be activated (ON state) in the I-branch and/or a combination of $l_2$ portions may be activated in the Q-branch, where each of the active combinations may attain a specific gain. The gains of both portions may define the amplitudes of the pair $(l_1, l_2)$, such that $l_1, l_2 = 1, \ldots,$ $$\sqrt{\frac{M}{V}},$$

where $$\sqrt{\frac{M}{V}}$$

refers to the number of available RIS portions groups/combinations in each branch.

In examples, the amplitude information (e.g., conveying M/V-ary information) may be transmitted both over the I-branch and the Q-branch (e.g., using the pair $(l_1, l_2)$). Both $l_1$ and/or $l_2$ may indicate the active portions (e.g., ON-portions state) in the I-branch and/or Q-branch, which are defined as $B_1^I, \ldots B_{l_1}^I$ and $B_1^Q, \ldots B_{l_2}^Q$, respectively (e.g., other portions are in the OFF-state).

In examples, the amplitude level may be applied for data/information symbol and/or reference signal (e.g., pilot signal).

A RIS may be configured to perform signal modulation that includes a phase component of the M-ary modulation.

In examples, elements (e.g., all elements) in the active portions (e.g., in each branch) may be tuned to a phase shift, for example, a specific phase shift (e.g., different/similar phase shifts could be applied to I-branch and/or the Q-branch).

In examples, the phase information (e.g., conveying V-ary information) may be transmitted over the phase shifts applied on the RIS elements in each of the active portions in the I-branch and/or the Q-branch.

In examples, the number of available phases V may be chosen as a divisor of $2^B$, with $\log_2 V$ being an integer not larger than B.

In examples, a phase shift of $$e^{j\frac{2\pi}{V}}$$

may be introduced between me I-branch and the Q-branch, for example, for the sake of forming a two-dimensional amplitude structure for the QA-PSK constellation.

In examples, the RIS phase shifts in the active portions in the I-branch and in the Q-branch $(B_1^I, \ldots, B_{l_1}^I$ and $B_1^Q, \ldots, B_{l_2}^Q)$ may be denoted as $\Theta_1^I, \ldots, \Theta_{l_1}^I$ and $\Theta_1^Q, \ldots, \Theta_{l_2}^Q$. The portions in the I-branch and Q-branch, respectively, may be denoted by $B_1^I, \ldots, B_{l_1}^I$ and $B_1^Q, \ldots, B_{l_2}^Q$. The I-branch may be expressed as $$\Theta_{(1:l_1)}^{I^T} = L_B\left(e^{j\frac{2\pi v}{V}} g_{(1:l_1)}^{I^H}\right) = e^{j\frac{2\pi v}{V}} L_B\left(g_{(1:l_1)}^{I^H}\right),$$

where $\Theta_{(1:l_1)}^I = [\Theta_1^I, \ldots, \Theta_{l_1}^I]$ and/or $g_{(1:l_1)}^I = [g_1^I, \ldots, g_{l_1}^I]$. The modulation phase shift for the I-branch may be denoted by $\Theta_{(1:l_1)}^I = [\Theta_1^I, \ldots, \Theta_{l_1}^I]$. The effective channel gain for the I-branch may be denoted by $g_{(1:l_1)}^I = [g_1^I, \ldots, g_{l_1}^I]$. The Q-branch may be expressed as $$\Theta_{(1:l_2)}^{Q^T} = e^{j\frac{2\pi}{V}} L_B\left(e^{j\frac{2\pi v}{V}} g_{(1:l_2)}^{Q^H}\right) = e^{j\frac{2\pi(v+1)}{V}} L_B\left(g_{(1:l_2)}^{Q^H}\right),$$

where $\Theta_{(1:l_2)}^Q = [\Theta_1^Q, \ldots, \Theta_{l_2}^Q]$ and/or $g_{(1:l_2)}^Q = [g_1^Q, \ldots, g_{l_2}^Q]$. The modulation phase shift for the Q-branch may be denoted by $\Theta_{(1:l_1)}^I = [\Theta_1^I, \ldots, \Theta_{l_1}^I]$. The effective channel gain for the Q-branch may be denoted by $g_{(1:l_2)}^Q$. The formula of $\Theta_{(1:l_1)}^I$ and/or $\Theta_{(1:l_2)}^Q$ may illustrate, for example, that an M-ary information symbol may be transmitted by choosing (e.g., appropriately choosing) the values of $(l_1, l_2)$ and/or v. The respective formulas of $\Theta_{(1:l_1)}^{I^T}$ and $\Theta_{(1:l_2)}^{Q^T}$ may denote the addition of the respective phase shift(s) of the effective channel, for example, upon transmission.

In examples, for reference signal, the v may be fixed. In examples, the received side may obtain the effective channel gain, for example, if the v is fixed.

In examples, in the QA-PSK scheme, information may be conveyed using two-dimensional M/V amplitude levels and/or V phase shifts. In examples, the set of received signals may be expressed as $$M_{A_{\frac{M}{V}}^V} = \left\{e^{j\frac{2\pi v}{V}}\left(\sum_{i_1'=1}^{l_1} X_{i_1'}^I + e^{j\frac{2\pi}{V}}\sum_{i_2'=1}^{l_2} X_{i_2'}^Q\right)\right\},$$

given $v = 0, 1, \ldots, V-1; l_1, l_2 = 1, \ldots,$ $$\sqrt{\frac{M}{V}},$$

where $A_{M/V}^V$ denotes the constellation size and/or $X_{i_1'}^I = g_{i_1'}^I \Theta_{i_1'}^I$ and/or $$X_{i_2'}^Q = e^{-j\frac{2\pi}{V}} g_{i_2'}^Q \Theta_{i_2'}^Q$$

express the channel gains of the active portions $B_{i_1'}^I$ and/or $B_{i_2'}^Q$ in the I-branch and Q-branch, respectively.

A RIS may be configured to perform signal modulation that includes QA-PSK MIMO transmission.

As FIGS. 7a, 7b, and 7c illustrate, for example, the RIS-based QA-PSK may be extended to a multiple symbol transmission by dividing the RIS into $N_s$ sections (e.g., $N_s$ is equivalent to the number of A-PSK symbols). In examples, each section may be further divided into an I-branch and/or a Q-branch. In examples, an independent QA-PSK modulation with beamforming may be carried out in each section (e.g., separately).

Figure 17A:
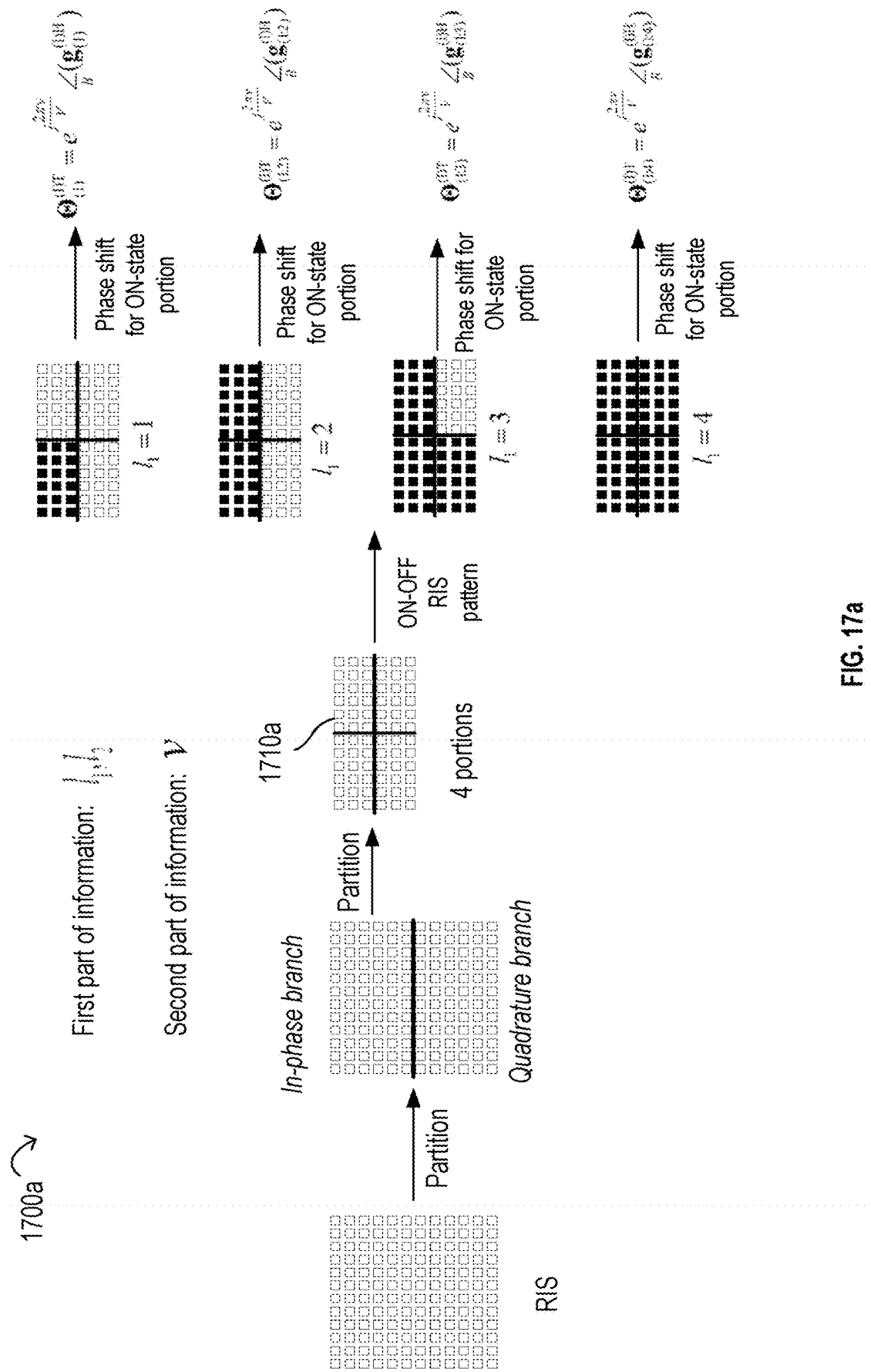
FIGS. 17a and 17b illustrate an example showing a RIS-based AQ-PSK modulation with 4 portions.
Figure 17B:
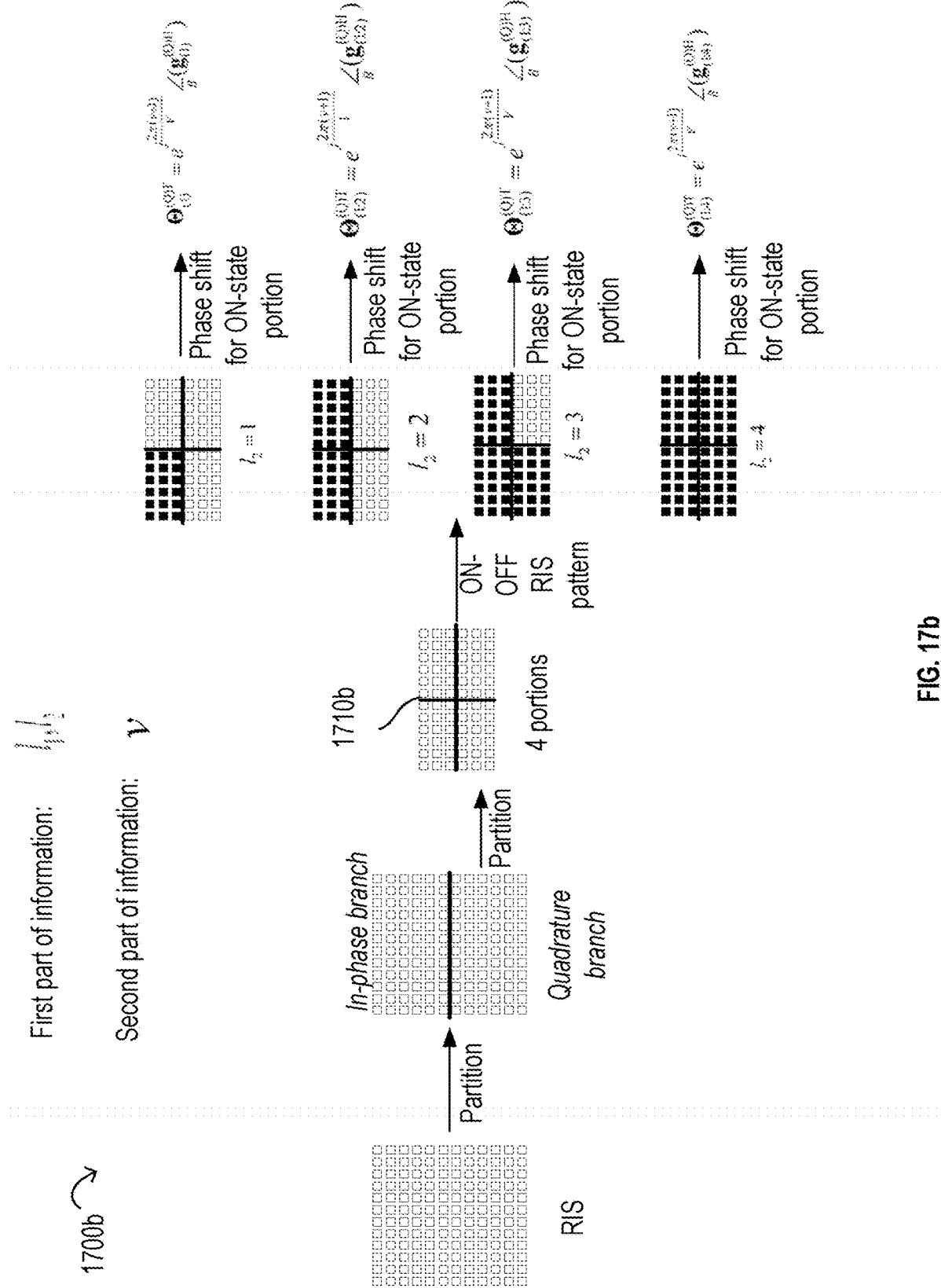

FIGS. 17a 1700a and 17b 1700b illustrate, an example of a RIS-based QA-PSK scheme. The RIS may be divided into two branches, an I-branch and Q-branch. Both branches may then be further divided (e.g., into 4 portions). FIG. 17a 1700a illustrates, for example, further division (e.g., into 4 portions) of the RIS based on the in-phase branch partition 1710a. FIG. 17b 1700b illustrates, for example, further division (e.g., into 4 portions) of the RIS based on the quadrature branch partition 1710b. For every pair of active portions ($l_1, l_2=1, \ldots, 4$) there may exist one or more (e.g., two) amplitude components (e.g., one for the I-branch and/or one for the Q branch). Additionally or alternatively, one or more (e.g., 4) phase shifts may be applied to the active portions in both branches separately.

FIG. 18 illustrates, for example, a RIS-based $A_{16}^8$-sized QA-PSK modulation 1800. Table 2 provides an example of a 16-ary information modulation of QA-PSK, including 4-ary amplitude information and/or 4-ary phase information.

TABLE 2

An example of 16-ary information modulation of QA-PSK, including 4-ary amplitude information and/or 4-ary phase information

| Amplitude information | ON/OFF-state of Portions at In-phase-branch | ON/OFF-state of Portions at Quadrature-branch |
|---|---|---|
| $l_1 = 1, l_2 = 1$ | ON: 1; OFF: 2 | ON: 1; OFF: 2 |
| $l_1 = 1, l_2 = 2$ | ON: 1; OFF: 2 | ON: 1,2; OFF: — |
| $l_1 = 2, l_2 = 1$ | ON: 1,2; OFF: — | ON: 1; OFF: 2 |
| $l_1 = 2, l_2 = 2$ | ON: 1,2; OFF: — | ON: 1,2; OFF: — |

| phase information | Phase shift at In-phase-branch | Phase shift at Quadrature-branch |
|---|---|---|
| v = 0 | 0 | $\frac{\pi}{2}$ |
| v = 1 | $\frac{\pi}{2}$ | $\pi$ |
| v = 2 | $\pi$ | $\frac{3\pi}{2}$ |
| v = 3 | $\frac{3\pi}{2}$ | 0 |

In examples, the MIMO extension, as depicted in FIG. 13, may be applicable to the QA-PSK scheme, where a RIS structure may be divided into one or more (e.g., multiple) sections (e.g., with each section transmitting/reflecting an independent symbol transmission).

A RIS may be configured to perform signal modulation that includes single-carrier transmission.

In examples, a RIS-based joint modulation and/or beamforming may rely (e.g., mainly rely) on single-carrier transmission, where the transmission scheme(s) (e.g., RIS-based joint modulation and/or beamforming) may exploit a single frequency to transmit the modulated signal.

In examples, a single carrier processing may be applied at the baseband processor. In examples, the resulting symbols information (e.g., amplitude and/or phase components) may be forwarded to the controller and/or applied to the RIS array.

Figure 19:
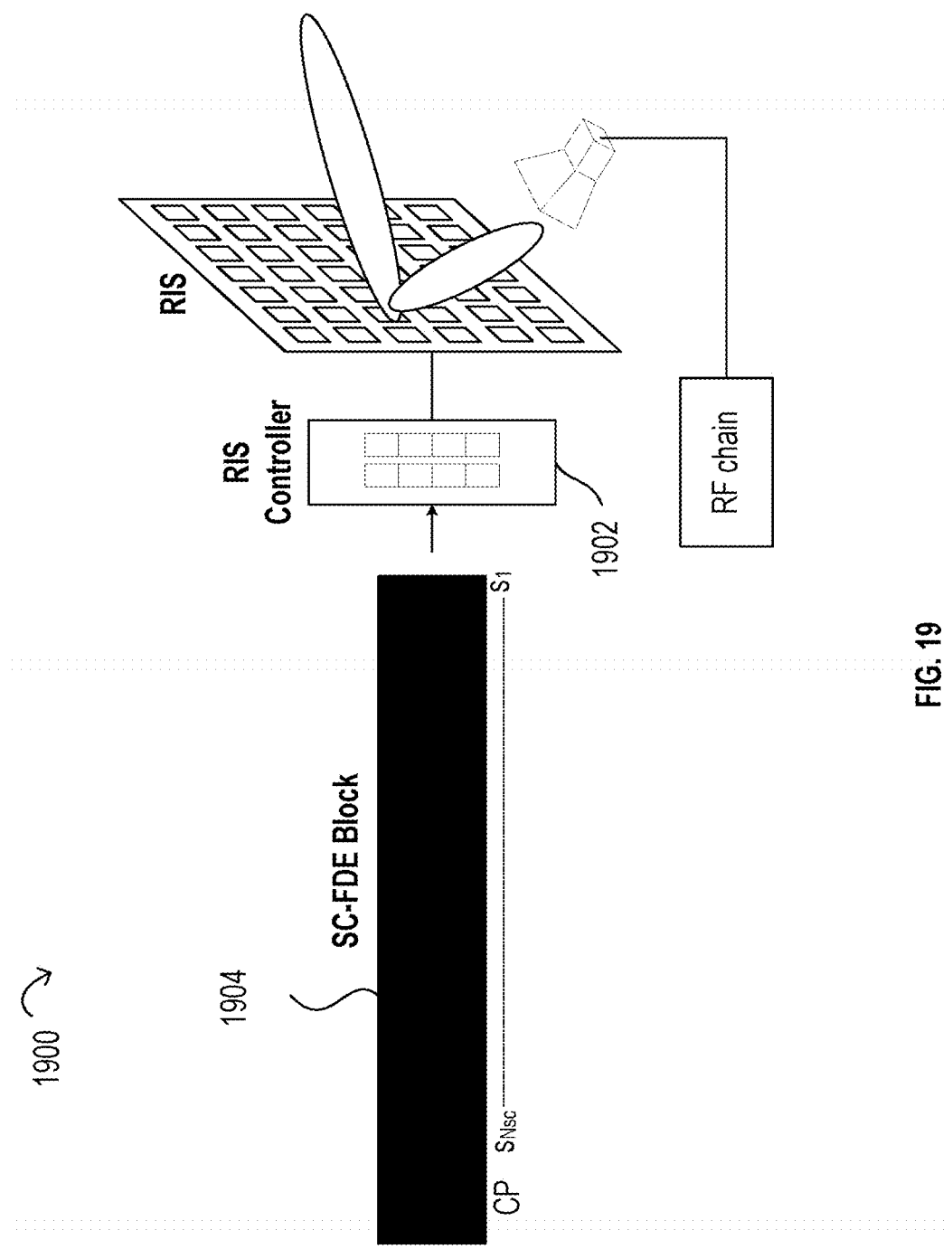
FIG. 19 illustrates an example of RIS-based SC-FDE transmission.

In examples, the baseband processor may prepare the time-domain portion of $N_{sc}$ symbols, for example, where single-carrier SC-FDE is applied. In examples, an $N_{cp}$-sized cyclic prefix may be added. As FIG. 19 depicts, for example, the amplitude and/or phase information of the (e.g., $N_{sc}$+ $N_{cp}$) portion 1904 may be forwarded to the RIS controller 1902.

A RIS may be configured to perform signal modulation that includes a constellation construction.

In examples, the size of the constellation in the RIS-based joint modulation and/or beamforming may depend on the RIS size (e.g., N), the number of portions and/or the number of elements in each block (e.g., $N_e$).

The Constellation construction may include one or more (e.g., a number) of portions and/or one or more (e.g., a number) of elements.

In examples, the number of portions may be related to the achievable throughput of the modulation. In examples, the number of portion combinations/groups (e.g., ON/OFF portion combinations) may increase, for example, as the number of portions increases. In examples, the number of bits conveyed over the amplitude component may increases, for example, as the number of portions increases.

In examples, the number of elements in each portion may determine the beamforming gain. In examples, the beamforming gain may increase, for example, as $N_e$ increases. In examples, the number of elements in each portion may decrease, for example, by increasing the number of portions. In examples, increasing the number of portion divisions in a RIS may improve the achievable throughput and/or reduce the attainable beamforming gain. In examples, the RIS-based transmission may have a trade-off between the achievable throughput and the beamforming gain.

In examples, dividing the RIS into one or more (e.g., multiple) sections may increase the number of simultaneous transmissions and/or reduce the number of portions per section and/or the number of elements in each portion.

A RIS may be configured to perform signal modulation that includes a constellation construction that uses one or more (e.g., a number of) elements per portion.

Figure 20:
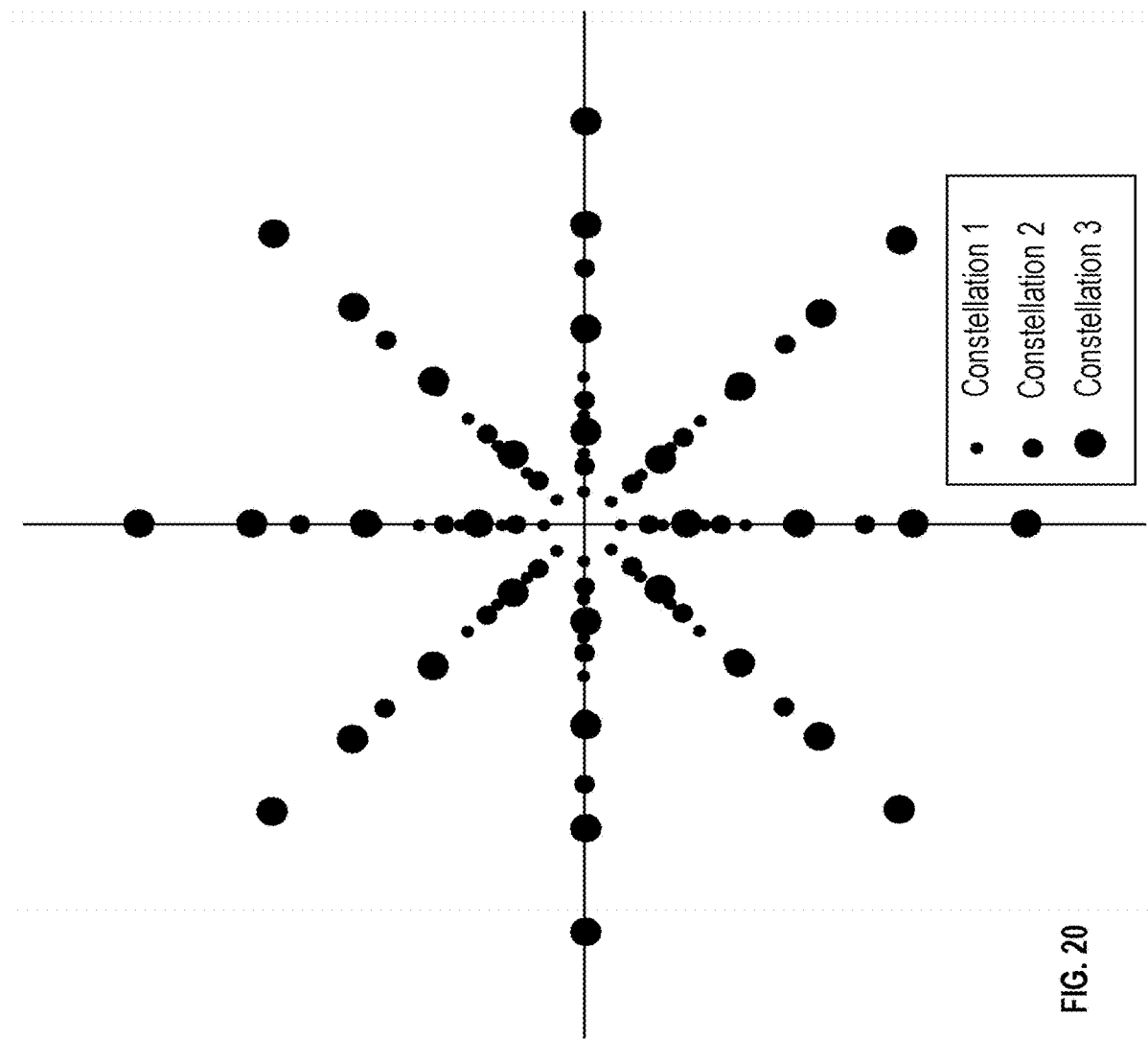
FIG. 20 illustrates an example of constellation expansion as a result of increasing the number of elements in each portion.

In examples, $N_e$ may be seen as a scaling factor, for example, given that the number of elements $N_e$ in each portion is proportional to the beamforming gain. FIG. 20 illustrates, for example, the effect of the number of elements per portion on the constellation 2000 (e.g., it may be assumed that the number of portion combinations remain constant and/or the number of elements in each portion varies). FIG. 20 depicts three constellations (e.g., color coded), for example: constellation 1, constellation 2 and/or constellation 3. In examples, the number of elements per portion may follow: constellation 1<constellation 2<constellation 3. FIG. 20 illustrates, for example, the size of the constellation may scales up as the number of elements per portion increases. In examples, the size of the constellation scaling up may come, for example, as a result of attaining an increased beamforming gain (e.g., as $N_e$ increases).

A RIS may be configured to perform signal modulation and/or coding scheme (MCS). The modulation and/or coding scheme (MCS) may create one or more constellations (e.g., A-PSK and/or QA-PSK) and/or coding rate. A RIS may be configured to use a first MCS method to create constellations and/or coding rate(s). A RIS may configured to use a second MCS method to create constellations and/or coding rate(s). A RIS may be configured to use a third MCS method to create constellations and/or coding rate(s).

A RIS may be configured to use a first method to create constellations (e.g., A-PSK and/or QA-PSK) and/or coding rate(s).

In examples, a look-up table may be defined at both the transmitter and/or receiver to perform the RIS-based adaptive modulation and/or coding (e.g., AMC) process. In examples, the look-up table may include information about the modulation scheme utilized (e.g., A-PSK, QA-PSK), code rate, efficiency, number of total portions, the number of elements per portion, and/or SNR gain (e.g., as a result of the portion size), where each is mapped to a RIS-CQI index Tables 3 and 4 may provide an example for and Table 4 for QA-PSK and/or A-PSK, respectively.

TABLE 3

RIS-based CQI table example based on A-PSK or QA-PSK

| RIS-CQI | (Amplitude) Order | Code rate R × [1024] | Spectral efficiency |
|---|---|---|---|
| 0 | 2 | 120 | 0.2344 |
| 1 | 3 | 157 | 0.3066 |
| . | . | . | . |
| . | . | . | . |
| . | . | . | . |
| N | 8 | . | . |
|   |   | . | . |
|   |   | . | . |

TABLE 4

RIS-based CQI table example based on A-PSK + QA-PSK

| RIS-CQI | Modulation | (Amplitude) Order | Code rate R × [1024] | Spectral efficiency |
|---|---|---|---|---|
| 0 | A-PSK | 2 | 120 | 0.2344 |
| 1 | A-PSK | 3 | 157 | 0.3066 |
| . | . | . | . | . |
| . | . | . | . | . |
| . | . | . | . | . |

TABLE 4-continued

RIS-based CQI table example based on A-PSK + QA-PSK

| RIS-CQI | Modulation | (Amplitude) Order | Code rate R × [1024] | Spectral efficiency |
|---|---|---|---|---|
| M | QA-PSK | 2 | . | . |
|   |   |   | . | . |
|   |   |   | . | . |
| M + 1 | QA-PSK | 3 | . | . |
|   |   |   | . | . |
|   |   |   | . | . |
| . | . | . | . | . |
| . | . | . | . | . |
| N | QA-PSK | 8 | . | . |
|   |   |   | . | . |
|   |   |   | . | . |

In examples, the WTRU may obtain the MCS from the DL control information (DCI), which is signaled by the gNB.

A RIS may be configured to use a second method to create constellations (e.g., A-PSK and/or QA-PSK) and/or coding rate(s).

In examples, the RIS-based transmitter may create a list of constellations (e.g., modulations) based on the size of the RIS (e.g., number of elements) and/or the phase-shift resolution (e.g., number of phase-shifts). As Table 5 illustrates, for example, each RIS-CQI may be mapped to a specific modulation scheme (e.g., A-PSK, QA-PSK) and/or a specific coding rate. In examples, the WTRU may obtain the MCS from the DL control information (DCI) which is signaled by the gNB.

TABLE 5

RIS-CQI table including the RIS division details

| RIS-CQI | Modulation | Code rate *X | Amplitude Index | Patterns | Phase Index | Phase Shifts | SNR gain | Efficiency |
|---|---|---|---|---|---|---|---|---|
| 0 | A-PSK |   | l = 1 | ON: 1; OFF: 2,3,4 | v = 0 | 0 |   |   |
|   |   |   | l = 2 | ON: 1,2; OFF: 3,4 | v = 1 | $\frac{\pi}{2}$ |   |   |
|   |   |   | l = 3 | ON: 1,2,3; OFF: 4 | v = 2 | $\pi$ |   |   |
|   |   |   | l = 4 | ON: 1,2,3,4; OFF: — | v = 3 | $\frac{3\pi}{2}$ |   |   |

A RIS may be configured to use a third method to create constellations (e.g., A-PSK and/or QA-PSK) and/or coding rate(s).

In examples, the WTRU may perform portion division and/or report the preferred bock division to the gNB, for example, by having the RIS-based transmitter based at the gNB, and/or assuming availability of information about the channel between the RIS and the WTRU (e.g., information about the channel can be captured). In examples, the portion report may be signaled as part of CSI report and/or in a form of a bitmap.

A RIS may perform modulation with the following simulation results.

The performance results for the performance of the proposed scheme(s) in terms of their DCMC capacity and/or SEP, against the RIS-based PSK modulation may be presented, where the distance between adjacent RIS elements is $\delta=2$, and the Rician factor is $\kappa=0$ dB. In examples, the number of RAs at the user may be assumed to be K=1, for example, for fairness of comparison with the RIS-based PSK modulation.

Figure 21:
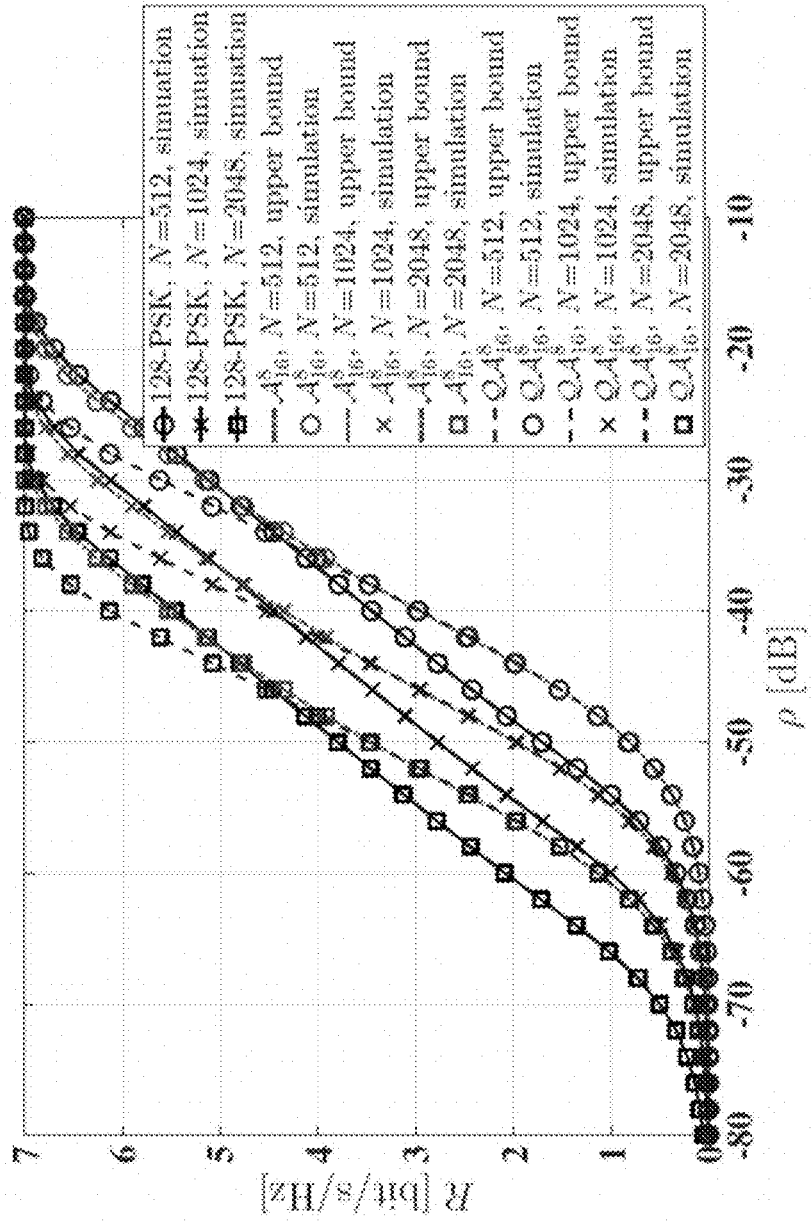
FIG. 21 illustrates an example of a comparison of DCMC capacity R versus SNR $\rho$ for the RIS-based 128-PSK, the proposed A-PSK with $A_{16}^8$ and QA-PSK with $A_{16}^8$ with different number of RIS elements N, where the RIS phase shift resolution is B=3 bits.

FIG. 21, for example, may compare the DCMC capacity R versus the received SNR for the RIS-based 128-PSK, the proposed A-PSK with $A_{16}^8$-sized constellation and/or QA-PSK $A_{16}^8$-sized constellation for different number of RIS elements N, where the RIS phase shift resolution is B=3 bits. In examples, the theoretical upper bound may be significantly more tight compared to the simulation results for our proposed schemes. FIG. 21 may show that in the low-SNR region, the DCMC capacity of the RIS-based PSK modulation is higher than that of the proposed A-PSK and/or QA-PSK scheme(s) 2100. In examples, the DCMC capacity of the proposed A-PSK and/or QA-PSK may be better than that of the RIS-based PSK scheme, for example, in the high-SNR region.

Figure 22:
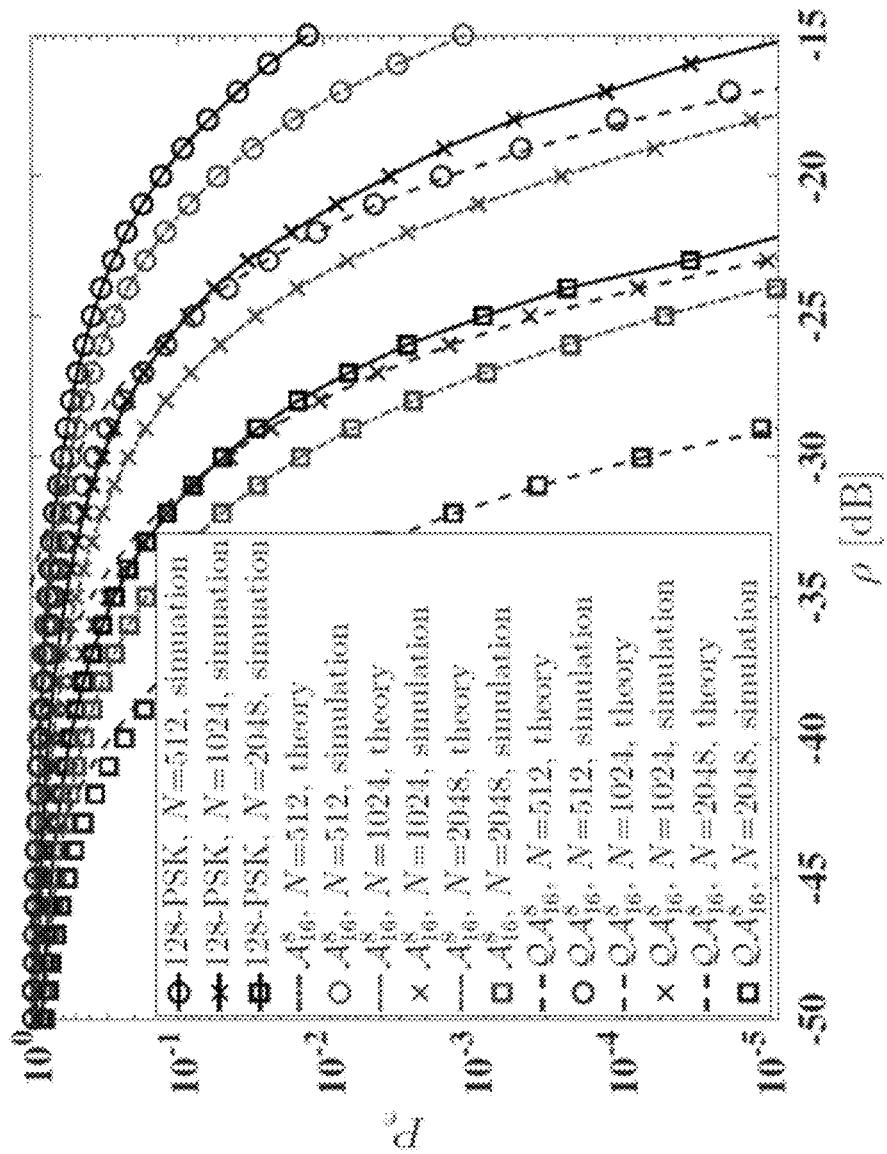
FIG. 22 illustrates an example of a comparison of symbol error probability $P_e$ versus SNR for various modulation schemes with different number of RIS elements N.

FIG. 22 2200 depicts, for example, a comparison of the SEP Pe and the receive SNR for the RIS-based 128-PSK modulation, the proposed A-PSK with $A_{16}^8$-sized constellation and QA-PSK with $A_{16}^8$-sized constellation, with the parameters being the same as in FIG. 21. FIG. 22 2200 shows that, for example, doubling the number of RIS elements may yield approximately 6 dB gain, since the number of elements is proportional to the square of the number of RIS elements N. Furthermore, FIG. 22 2200 shows that, for example, under the same transmission rate of 7 bit/s/Hz, the A-PSK with $A_{16}^8$-sized constellation and/or QA-PSK with $A_{16}^8$-sized constellation may have better SEP than the RIS-based 128-PSK. Furthermore, QA-PSK may outperform A-PSK, for example, since the transmit signals of QA-PSK are distributed more uniformly than those of A-PSK, which results in higher minimum distance in the received signal constellation.

Figure 23:
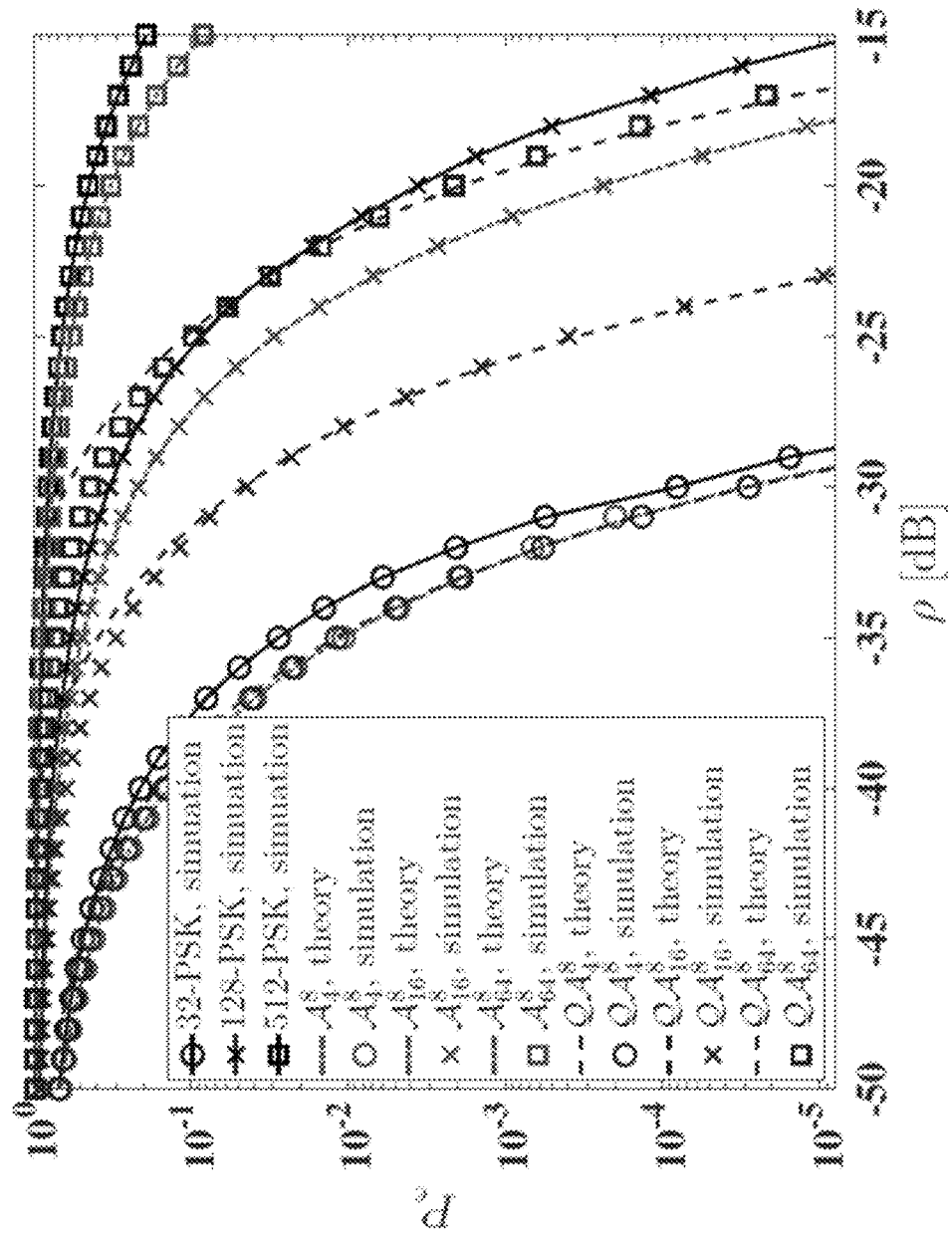
FIG. 23 illustrates an example of a comparison of symbol error probability $P_e$ versus receive SNR for various modulation schemes with different transmission rate R.

FIG. 23 2300 illustrates, for example, a comparison of the SEP Pe and the receive SNR of the RIS-based 128-PSK modulation, of the proposed A-PSK and/or QA-PSK at different transmission rates R, for N=1024 RIS elements, and/or for B=3 bits. In examples, in the RIS-based scheme, 32-PSK, 128-PSK and 512-PSK may be employed at R=5; 7; 9 bit/s/Hz, respectively. By contrast, in the proposed methods, the $A_{16}^8$, $A_{16}^8$ and $A_{64}^8$-sized constellation APSK schemes and/or $A_{16}^8$, $A_{16}^8$ and $A_{64}^8$-sized constellation QA-PSK schemes are employed correspondingly. In examples, at low rates of R=5 bit/s/Hz, the advantage of QA-PSK may not be obvious. In examples, at high rates of R=9 bit/s/Hz, QA-PSK may considerably outperform the RIS-based PSK and/or A-PSK. In examples, the proposed QA-PSK scheme may have improved the SEP, especially at high transmission rates.

Figure 24:
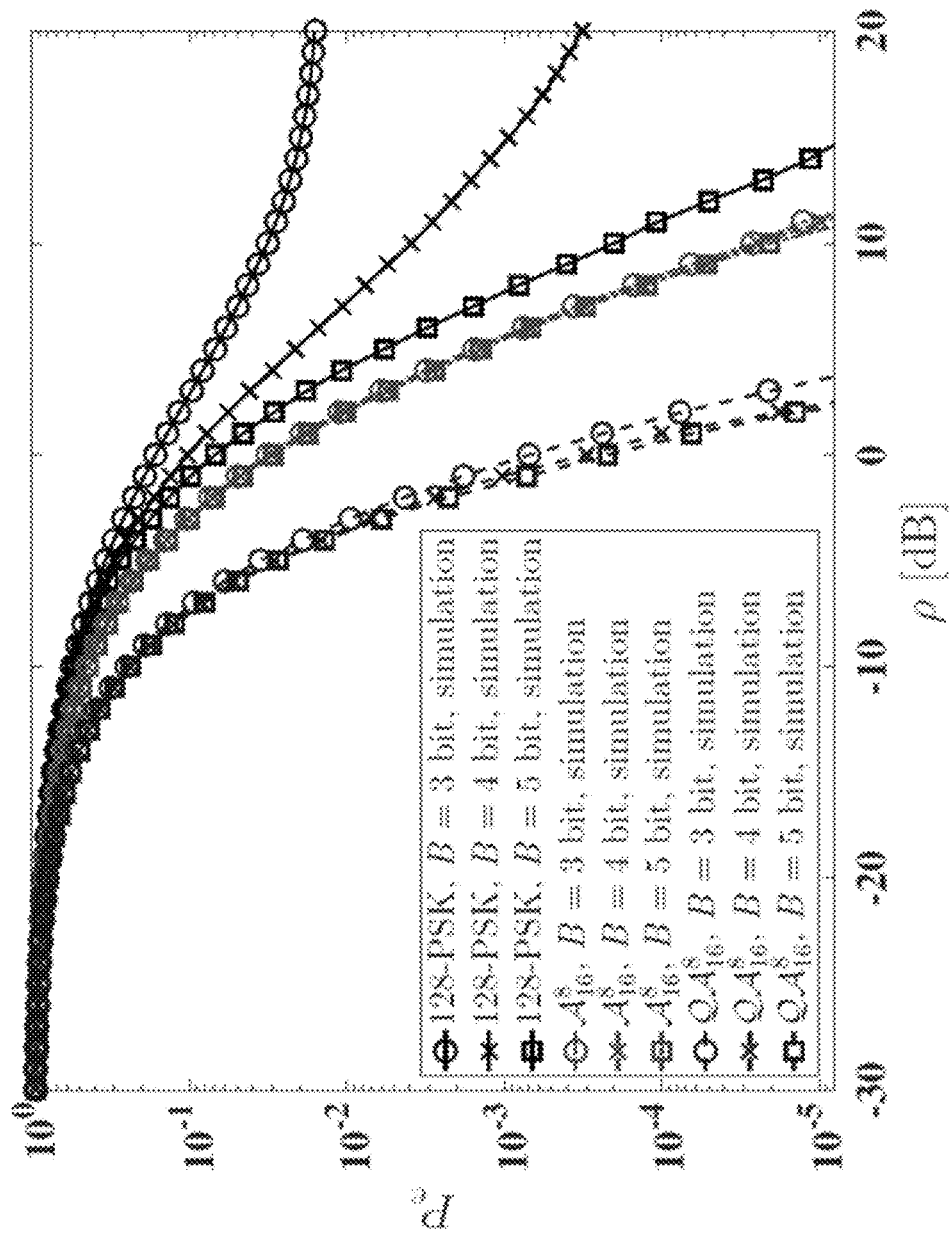
FIG. 24 illustrates an example of a comparison of symbol error probability $P_e$ versus receive SNR for various modulation schemes with different RIS phase shift resolution B.

FIG. 24 2400 illustrates, for example, a comparison of the SEP and received SNR of the RIS-based 128-PSK, of the proposed $A_{16}^8$-sized constellation A-PSK and $A_{16}^8$-sized constellation QA-PSK at different values of B, where the number of RIS elements is N=64. In examples, the finite phase shift resolution may degrade the SEP of the RIS-based PSK. In examples, degradation of the SEP of the RIS-based PSK may have no (e.g., insignificant) effect on the proposed schemes.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A transmitter device comprising:
    a reconfigurable intelligent surface (RIS), the RIS comprising a plurality of separately activable and controllable portions; and
    a processor configured to control the RIS to generate one or more modulated symbols, wherein the processor is configured to generate an amplitude of the one or more modulated symbols by activating one or more of the plurality of portions of the RIS, and the processor is configured to generate a phase of the one or more modulated symbols by controlling one or more phase shifts applied by the one or more activated portions of the RIS, and the processor is configured to receive feedback that indicates preferred portions of the RIS for transmission.

2. The transmitter device as in claim 1, wherein the processor is configured to apply a respective beamforming weight to each of the one or more activated portions of the RIS.

3. The transmitter device as in claim 1, wherein the processor is configured to control the RIS to generate a plurality of modulated symbols, wherein each of the plurality of modulated symbols is generated using a different section of the RIS.

4. The transmitter device as in claim 3, wherein each of the different sections of the RIS is associated with a plurality of respective portions.

5. The transmitter device as in claim 4, wherein each of the plurality of respective portions for a given section is controlled by the processor to generate a respective modulated symbol of the plurality of modulated symbols by controlling which of the respective portions are activated and controlling which of the respective phase shifts applies to one or more of the respective activated portions.

6. The transmitter device as in claim 1, wherein the plurality of portions of the RIS comprise a first subset of portions and a second subset of portions, wherein the first subset of portions is controlled by the processor to generate an in-phase part of the one or more modulated symbols, and the second subset of portions is controlled by the processor to generate a quadrature part of the one or more modulated symbol.

7. The transmitter device as in claim 6, wherein the one or more modulated symbol corresponds to a quadrature amplitude phase shift keying (QA-PSK) type of modulated symbol.

8. The transmitter device as in claim 1, wherein the one or more modulated symbols correspond to an amplitude phase shift keying (A-PSK) type of modulated symbol.

9. The transmitter device as in claim 1, wherein the processor is configured to receive an indication of the one or more activated portions of the RIS and the one or more phase shifts applied by the one or more activated portions of the RIS from a radio frequency baseband processor of the transmitter.

10. The transmitter device as in claim 1, wherein the processor being configured to receive the feedback comprises the processor being configured to receive channel quality indication (CQI) feedback, wherein the CQI feedback indicates the preferred portions of the RIS for transmission.

11. A method implemented by a transmitter device, the method comprising:
controlling a reconfigurable intelligent surface (RIS) to generate one or more modulated symbols, wherein the RIS comprises a plurality of separately activable and controllable portions, an amplitude of the one or more modulated symbols is generated by activating one or more of the plurality of portions of the RIS, and a phase of the one or more modulated symbols is generated based on phase shifts applied by the one or more activated portions of the RIS;
transmitting the one or more modulated symbols using the RIS; and
receiving feedback that indicates preferred portions of the RIS for transmission.

12. The method of claim 11, wherein the one or more modulated symbols comprise a plurality of modulated symbols, and different sections of the RIS are used for generating each of the plurality of modulated symbols.

13. The method as in claim 12, wherein each of a plurality of respective portions of a given section is used to generate a respective modulated symbol of the plurality of modulated symbols by controlling which of the respective portions are activated and controlling which of the respective phase shifts applies to one or more of the respective activated portions.

14. The method as in claim 11, wherein the plurality of portions of the RIS comprise a first subset of portions and a second subset of portions, wherein the first subset of portions is used to generate an in-phase part of the one or more modulated symbols, and the second subset of portions is used to generate a quadrature part of the one or more modulated symbol.

15. The method as in claim 14, wherein the one or more modulated symbol corresponds to a quadrature amplitude phase shift keying (QA-PSK) type of modulated symbol.

16. The method as in claim 11, wherein the one or more modulated symbols correspond to an amplitude phase shift keying (A-PSK) type of modulated symbol.

17. The method as in claim 11, further comprising transmitting a reference signal using the RIS, wherein the reference signal is transmitted without applying a phase shift to the reference signal.

18. The method as in claim 11, wherein receiving the feedback comprises channel quality indication (CQI) feedback, wherein the CQI feedback indicates the preferred portions of the RIS for transmission.

19. A transmitter device comprising:
a reconfigurable intelligent surface (RIS), the RIS comprising a plurality of sections, each of the plurality of sections comprising separately activable and controllable portions; and
a processor configured to:
receive feedback that indicates preferred portions of the RIS for transmission;
transmit a first modulated symbol using a first section of the plurality of sections of the RIS, wherein the processor is configured to generate an amplitude of the first modulated symbol by activating one or more portions of a plurality of portions of the first section of the RIS, and the processor is configured to generate a phase of the first modulated symbol by controlling the RIS to apply one or more phase shifts to the one or more activated portions of the first section of the RIS; and
transmit a second modulated symbol using a second section of the plurality of sections of the RIS, wherein the processor is configured to generate an amplitude of the second modulated symbol by activating one or more portions of a plurality of portions of the second section of the RIS, and the processor is configured to generate a phase of the second modulated symbol by controlling the RIS to apply one or more phase shifts to the one or more activated portions of the second section of the RIS.

20. The transmitter device as in claim 19, wherein the processor is configured to control the RIS to apply a respective beamforming weight to each of the one or more activated portions of the first section of the RIS and the one or more activated portions of the second section of the RIS.

* * * * *